(12) United States Patent
Miserendino et al.

(10) Patent No.: US 12,513,161 B2
(45) Date of Patent: Dec. 30, 2025

(54) SYSTEMS AND METHODS FOR EVENT DETECTION

(71) Applicant: Comcast Cable Communications, LLC, Philadelphia, PA (US)

(72) Inventors: Scott Miserendino, Arlington, VA (US); Ryan Peters, Arlington, VA (US); Vincent Santillo, Arlington, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 292 days.

(21) Appl. No.: 18/187,365

(22) Filed: Mar. 21, 2023

(65) Prior Publication Data

US 2023/0344839 A1 Oct. 26, 2023

Related U.S. Application Data

(60) Provisional application No. 63/333,028, filed on Apr. 20, 2022.

(51) Int. Cl.
*H04L 9/40* (2022.01)

(52) U.S. Cl.
CPC ...... *H04L 63/1416* (2013.01); *H04L 63/1433* (2013.01)

(58) Field of Classification Search
CPC ............. H04L 63/1416; H04L 63/1425; H04L 63/1433; H04L 2463/141–143; H04L 2463/146

See application file for complete search history.

(56) References Cited

U.S. PATENT DOCUMENTS

| | | | | |
|---|---|---|---|---|
| 8,253,563 B2* | 8/2012 | Burnard | ............ | G08B 13/1681 340/541 |
| 8,570,861 B1* | 10/2013 | Brandwine | ............ | H04L 45/70 370/230 |
| 2009/0320131 A1* | 12/2009 | Huang | ................ | H04L 63/1408 726/23 |
| 2012/0143650 A1* | 6/2012 | Crowley | ............ | G06Q 10/0635 726/25 |
| 2015/0371044 A1* | 12/2015 | Horne | ................... | G06F 21/577 726/25 |
| 2016/0063418 A1* | 3/2016 | Roddy | ............ | G06Q 10/06315 705/7.25 |
| 2017/0155562 A1* | 6/2017 | Vasant | ..................... | H04L 63/20 |

(Continued)

*Primary Examiner* — Eric W Shepperd
(74) *Attorney, Agent, or Firm* — Ballard Spahr LLP

(57) ABSTRACT

Technologies are provided for identification of cyberattack campaigns. Cyberattack campaigns are represented by temporal graphs based on detection events representing suspicious activities in a computer network. Temporal relationships and property relationships among the detection events dictate the node and edge structure of a temporal graph representing a cyberattack campaign. By tracking how those relationships change over time, changes to the node and edge structure of the temporal graph can be determined. Those changes reveal the dynamics of the cyberattack campaign by identifying time-dependent changes in the connections across multiple network entities that are involved in the cyberattack campaign. Accordingly, the temporal graph may represent the entire evolution of a cyberattack campaign since its inception in a computer network.

22 Claims, 17 Drawing Sheets

(56) References Cited

U.S. PATENT DOCUMENTS

| | | | | |
|---|---|---|---|---|
| 2018/0124110 A1* | 5/2018 | Hunt | .................... | G06F 16/951 |
| 2018/0288078 A1* | 10/2018 | Balasundaram | .... | H04L 63/1416 |
| 2018/0367547 A1* | 12/2018 | Jang | .................... | G06F 21/552 |
| 2019/0020666 A1* | 1/2019 | Leung | ................ | H04L 63/0227 |
| 2019/0034932 A1* | 1/2019 | Sadaghiani | ............ | G06N 20/00 |
| 2020/0342121 A1* | 10/2020 | Wang | ....................... | H04L 9/14 |

* cited by examiner

SYSTEMS AND METHODS FOR EVENT DETECTION

CROSS-REFERENCE TO RELATED PATENT APPLICATION

This application claims priority to U.S. Provisional Patent Application No. 63/333,028, filed on Apr. 20, 2022, the entirety of which is incorporated by reference herein.

BACKGROUND

Cyberattacks are often part of a coordinated campaign against a specific target. Cyberattack campaigns typically have a defined goal or objective. Those cyberattack campaigns often contain similar properties, behaviors, and attributes in order to achieve the defined goal or objective over a period of time. Cyberattack campaigns, however, vary widely in terms of extent, duration, and effect. In extreme cases, a cyberattack campaign may continue undetected for months or even years and may involve hundreds of compromised network entities. In other far less dramatic cases, a cyberattack campaign may last for minutes and may involve a handful of devices.

Complexity and overall sophistication of cyberattack campaigns may render them both pervasive and insidious. As a result, information technology (IT) platforms administering an afflicted computer network oftentimes struggle—and even fail—to identify cyberattack campaigns. Even with access to commonplace automated cybersecurity products that may assist in uncovering a cyberattack campaign, IT platforms still triage a seemingly never-ending stream of threat detection data. Given the rich structure of malicious activities involved in a cyberattack campaign, such commonplace automated cybersecurity products typically fail to unveil correlations, some of which may be quite subtle, within threat detection data. Therefore, commonplace automated cybersecurity products may be inadequate to uncover cyberattack campaigns. When such products do uncover a cyberattack campaign, the characterization of a breach associated with the cyberattack campaign may be incomplete or imprecise, or both.

SUMMARY

It is to be understood that both the following general description and the following detailed description are exemplary and explanatory only and are not restrictive.

This disclosure covers identification of cyberattack campaigns. Cyberattack campaigns are represented by temporal graphs based on detection events representing suspicious activities in a computer network. Temporal relationships and property relationships among the detection events dictate the node and edge structure of a temporal graph representing a cyberattack campaign. By tracking how those relationships change over time, changes to the node and edge structure of the temporal graph can be determined. Those changes reveal the dynamics of the cyberattack campaign by identifying time-dependent changes in the connections across multiple network entities that are involved in the cyberattack campaign. Accordingly, the temporal graph may represent the entire evolution of a cyberattack campaign since its inception in a computer network.

The disclosure also provides visualization tools that, individually or in combination, permit analyzing the entire evolution of a cyberattack campaign. User interfaces permit isolating a particular campaign period or panning the view of network entities or related detection events across multiple campaign periods in order to analyze the history of the cyberattack campaign and better understand the evolution of that cyberattack since its inception. By presenting detection events and associated network entities as a graph, connections across multiple network entities that are involved the cyberattack campaign can be readily identified. As a result an IT platform that administers the computer network may provide incident response, and also may orchestrate additional data collection via dynamic tasking to confirm the cyberattack campaign.

Other examples and configurations are possible. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The annexed drawings are an integral part of the disclosure and are incorporated into the subject specification. The drawings illustrate example embodiments of the disclosure and, in conjunction with the description and claims, serve to explain at least in part various principles, elements, or aspects of the disclosure. Embodiments of the disclosure are described more fully below with reference to the annexed drawings. However, various elements of the disclosure may be implemented in many different forms and should not be construed as limited to the implementations set forth herein. Like numbers refer to like elements throughout.

DETAILED DESCRIPTION

Figure 1:
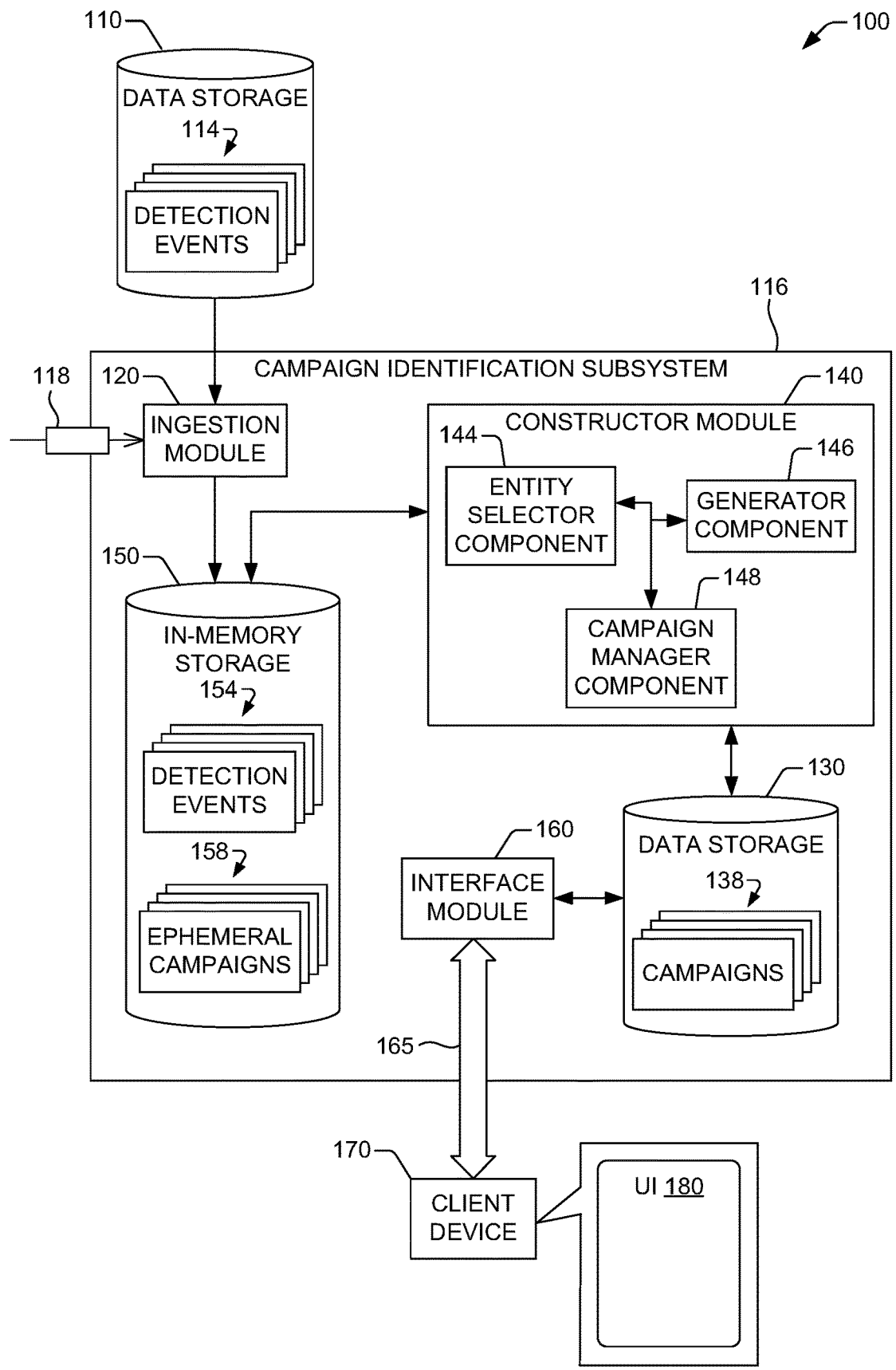
FIG. 1 shows an example computing system to identify cyberattack campaigns.

The disclosure recognizes and addresses, among other technical challenges, the issue of identification of cyberattack campaigns in a computer network. A cyberattack campaign may include various types of detection events, each of which is indicative of a potentially suspicious event within the computer network. In this disclosure, detection events may be analyzed based on determined time-to-live (TTL) values, as well as based on other attributes (e.g., features, properties, and/or artifacts) of the detection events. By analyzing detection events, relationships among network entities (e.g., hosts and user accounts) that may be potentially affected by malicious activity within the computer network may be determined over time. Therefore, a temporal evolution of a cyberattack campaign may be tracked. In this disclosure, the TTL values may be determined for different event types based on severity of detection events. For example, an event of visiting a "bad" site may be associated with a shorter TTL, whereas receiving/downloading information from the "bad" site may be associated with a longer TTL. Setting such TTL values for different detection events results in more effective tracking of detection events and association of the detection events with cyberattack campaigns being monitored.

Further, in this disclosure, cyberattack campaigns—e.g., groupings of detection events—are represented by temporal graphs based on detection events representing suspicious activities involving network entities in a computer network. A network entity refers to a component that provides defined functionality within a network of computing devices. As mentioned, examples of a network entity comprise a personal computer (PC), a server, a user device, a user account, and similar components. Some network entities are physical devices, such as a server device, a client device, a storage server device, or similar. Other network entities are defined in a cloud environment and may comprise virtual machines, a cloud host, a cloud user account, a cloud-storage object, or similar entities. A temporal graph representing a cyberattack campaign incorporates time-dependent changes in relationships among such detection events. Thus, the temporal graph readily captures the dynamics of the cyberattack campaign by identifying time-dependent changes in the connectivity across multiple network entities that are involved in the cyberattack campaign. Accordingly, the temporal graph may represent the entire evolution of a cyberattack campaign since its inception in the computer network.

Because temporal graphs may synthesize a wealth of data identifying potentially suspicious events associated with cyberattack campaigns, a temporal graph may provide, in a single data structure, information characterizing the dynamics of a cyberattack campaign. For example, the temporal graph may identify what breaches, if any, may be underway; how, where, and when did the breaches begin; what systems, both internal and external, have been involved in a breach; what tools and/or techniques has a threat actor leveraged; how long has the threat actor dwelled; or similar information.

The cyberattack campaign identification functionalities described herein constitute a holistic approach to determining the presence and evolution of a cyberattack campaign in a computer network. That holistic approach is superior to commonplace approaches in many ways. Some existing technologies, for example, focus on collecting detection events individually into databases, without analysis. As such, while anomalous activities may be recorded essentially completely, some of those activities per se do not constitute malicious activity. Indeed, the lack of analysis of the detection events being collected may not identify cyberattack campaigns, let alone characterize of the evolution of a cyberattack campaign. Other existing technologies, for example, attempt to relate individual anomalous activities around a particular system with the computer network. Such existing technologies are myopic and may not identify cyberattack campaigns, particularly those that are intricate and involve numerous computing systems in the computer network.

FIG. 1 shows an example computing system 100 to identify cyberattack campaigns. The computing system 100 comprises an ingestion module 120 that accesses configuration data 118 defining one or multiple parameters that control, at least partially, the manner of identifying a cyberattack campaign. In some cases, multiple parameters may be defined, including a parameter identifying a discovery period $\Delta t$ (e.g., a time period) during which detection events may be analyzed, and another parameter identifying an update period $\delta t$ defining the periodicity of cyberattack campaign identification/update. That is, the update period defines how frequently the campaign identification process described herein is to be implemented in order to identify new cyberattack campaign(s) and/or update representations of existing cyberattack campaigns. Examples of $\delta t$ include 2 hours, 4, hours, 6 hours, 8 hours, 12 hours, and 24 hours. The discovery period may be equal to or greater than the update period. For example, the discovery period may be configured to 24 hours and the update period may be configured to 12 hours.

For purposes of illustration, a detection event is the identification of an anomalous network operation at a particular time, within a computer network. The anomalous network operation exceeds a baseline of normal operation and/or satisfies one or more anomaly criteria. The detection event corresponds to one or more network entities and has a timestamp (or another type of datum) indicative of the particular time and one or more observables respectively identifying the one or more network entities.

As part of identification of a cyberattack campaign, the campaign identification subsystem 116 analyzes detection events periodically, at consecutive time intervals, each equal to the update period $\delta t$, where the detection events may occur at times within the discovery period $\Delta t$, relative to a current analysis time. Here, the current analysis time can be defined as $T_n = n\delta t + T_0$, where $T_0$ is the time origin for a campaign timeline, and n is a natural number indicating an iteration in the periodic identification of a campaign and update of a representation of an existing cyberattack campaign. Time may correspond to network time, as opposed to wall-clock time. Hence, $\delta t$ represents a time interval of network time (e.g., 12 hours) based on timestamps of incoming network logs and/or detection events. Accordingly, rather than representing a wall-clock starting time for campaign identification, $T_0$ may represent a historical time based on those network logs or detection events. In some cases, however, time may correspond to wall-clock time.

Those time intervals at which detection events are analyzed provide a regular discretization of the timeline of a cyberattack campaign. Thus, the cyberattack campaign can be updated incrementally, at discrete campaign periods corresponding to respective update periods. A discrete campaign period may be referred to as a campaign epoch and has an end time referred to as an analysis time. As a result, the temporal evolution of the cyberattack campaign over a particular time interval can be cast in terms of a collection of individual campaign epochs during each of which multiple detection events and their mutual relationships are represented by a graph as is described herein. It is noted that analyzing detection events dynamically and/or on-demand does not yield such a temporal evolution in terms of campaign epochs. For example, updating a cyberattack campaign dynamically, in response to a detection event, can result in updates that are based on an incomplete set of detection events because a time interval between detection events may be less than the time incurred in performing the analysis to update the cyberattack campaign. Consequently, consecutive updates may artificially lack changes to the cyberattack campaign. Therefore, without analyzing detection events periodically, computing resources may be inefficiently used. As another example, updating the cyberattack campaign on-demand may entail prompting an analyst agent (a human agent, for example) to initiate the analysis of detection events. Prompting the analyst agent can be based on determining that a campaign change satisfies a defined criterion. Thus, while the prompting may involve analyzing available detection events with a particular analysis cadence, an update to the cyberattack campaign may be subjected to responsiveness of the analyst agent.

The ingestion module 120 may receive data defining one or multiple detection events present during the discovery period Δt. The ingestion module 120 may receive that data from a data storage 110 that retains data defining detection events 114. The ingestion module 120 can retain the received data within an in-memory storage 150, as detection events 154. The in-memory storage 150 may have low latency that permits rapid access to data retained in the in-memory storage 150. Example of low latency include latencies of the order of 10 ms, latencies of the order of 1 ms, and in some cases, sub-millisecond latencies. The in-memory storage 150 thus embodies a performant cache for storage and readout of data. For example, the in-memory storage 150 can be embodied in an in-memory key-value cache having low latency, such as remote dictionary server (Redis).

The data defining detection events 114 can be retained in a relational database within the data storage 110, for example. The data defining the detection events 114 may be generated by one or more analyzer modules (not shown in FIG. 1). As such a detection event may be referred to as an analytic hit. Examples of analyzer modules include Intel analyzer module, intrusion detection system (IDS) analyzer module, create file analyzer module, and user behavior anomaly (UAB) analyzer module.

A detection event can include various attributes that characterize the detection event. Data defining a detection event can define multiple attributes of the detection event. An attribute included in a detection event is, for example, a timestamp identifying a time at which the detection event occurred. Another attribute that may be included in the detection event is, for example, a source identifier (source ID) that conveys an analyzer module that generated the detection event. Another attribute included in the detection event is, for example, an event type (or hit type). The event type comprises a short description of the generic type of the detection event. The short description can be generated by the analyzer module that generated the detection events. Examples of the short description can include "suspicious file," "anomalous login," "suspicious behavior," "user mismatch," or description of similar activity.

Another attribute included in the detection event is, for example, an internal entity ID for an internal network entity of a first type (e.g., a user account or a host) involved in the detection event. The entity ID may be unique, such as a universally-unique identifier (UUID). The entity ID attribute may be void in cases where the entity ID is unavailable from the analyzer module. Another attribute included in the detection event is, for example, another internal entity ID for another internal network entity of a second type (e.g., a user account) involved in the detection event. Such an attribute also may be void in cases where that other entity ID is unavailable from the analyzer module. Similarly, another attribute included in the detection event is, for example, an external entity ID for an external network entity of a first type (e.g., a user account) involved in the detection event. Such an attribute also may be void in cases where that external entity ID is unavailable from an analyzer module. Yet another attribute included in the detection event is, for example, another external entity ID for an external network entity of a second type (e.g., a host) involved in the detection event. Such an attribute also may be void in cases where that external entity ID is unavailable from an analyzer module.

Another attribute included in a detection event is, for example, a group of artifacts of the detection event. An artifact is unrelated to any one of the internal network entities (host or user account, for example) covered by other attributes of the detection event. The group of artifacts differs across types of detection events. As an example, an intrusion detection system (IDS) detection event may include a signature ID as a property. As another example, an antivirus detection event may include a signature name and file hash. As yet another example, a Command and Control (C2) detection event may include an ID (such as an IP address or hostname) for an external host involved and beacon protocol type (e.g., hypertext transfer protocol (HTTP), hypertext transfer protocol secure (HTTPS), domain name system (DNS), and so forth).

Another attribute included in the detection event is an impact score, for example. The impact score may be a numerical value that quantifies an impact or significance of the detection event. Lower numerical values convey lesser significance. Such an impact score may dictate a degree of interest that an analyst agent (e.g., a human or an autonomous bot) could assign to the detection event. Lower impact scores dictate lesser degree of interest.

Impact of a potentially suspicious event corresponding to a detection event may decrease over time. Thus, the impact score included in the detection event may be time dependent, decreasing over time—referred to herein in some examples as a "decaying impact score." A time dependent function defining the impact score can be (or comprise) an impulse function at the time corresponding to the timestamp of the detection event, and the time dependent function may also be followed by (or comprise) a decay function. The time corresponding to the timestamp of the detection event may be referred to as the temporal origin of the detection event. The impulse function can have a finite amplitude (e.g., an impulse amplitude) defined by an initial impact score ($\sigma_0$). The initial impact score may be provided by the analyzer module that identified the detection event. The decay function may be, for example, a monotonically decreasing function that is continuous and positive-definite. The decay function may be parameterized at least in part by a half-life parameter. A zero-life parameter may be configured for the decay function. Time difference between the temporal origin of the detection event and half-life parameter is the time interval that must elapse for the score to be equal to $\sigma_0/2$. Because the half-life parameter may parameterize the decay function, the half-life parameter may determine, at least partially, the impact score (e.g., the "decaying impact score") at any time between the temporal origin of the detection event and the zero-life of the detection event.

In one example, the decay function is a shifted logistic function having a shift defined by the half-life parameter. A logistic function is a continuous, positive-definite monotonically decreasing function. When appropriately scaled, shifted, and parameterized, the logistic function may provide substantially three regions of operation. A first region where values of the logistic function are approximately equal to 1 (but do not exceed 1) for a substantial portion prior to the half-life (or half-life parameter); a second region, which can be referred to as a transition region, where values of the logistic function transition from approximately 1 to approximately 0; and a third region where values of the logistic function are approximately 0 (but no negative). By using a single parameter along with the half-life parameter, sharpness of the transition region may be adjusted. Because the logistic function has two asymptotic regions guarantees that values of the logistic function over time remain between 0 and 1 without the need for cutoffs. In another example, the decay function is a linear function, such as $s(t)=\sigma_0-(\sigma_0*t)/(2*t_{half})$, where $t_{half}$ represents the half-life. The linear function requires cut offs at the time origin and at large values of time, and a separate parameter to control roll off is unavailable. In other words, the monotonic decrease of the linear function is fully determined by the half-life parameter. In yet another example, the decay function is an exponential decay function, such as $s(t)=\sigma_0 \exp(-t*\ln(2)/t_{half})$, where t is greater than or equal to 0. In this example, the half-life parameter defines the roll off of the decay function. In still another example, the decay function is an inverse cotangent function, such as $s(t)=2*(\sigma_0/\pi)\text{arccot}(\cot(\pi/4)*t/t_{half})$.

Time difference between timestamp and zero-life parameter is the time interval that must elapse for the impact score (e.g., the "decaying impact score") to be equal to zero and, thus, to consider the detection event to be inactive. In other words, the zero-life parameter defines the time interval since the temporal origin during which interval the detection event is deemed active and available for campaign identification. That time interval is the time considered when determining overlap between detection events.

Accordingly, another attribute included in the detection event is a zero-life parameter defining a time interval during which the detection event is considered active. The time interval defined by the zero-life parameter can be referred to as zero-effect time or event time-to-live (TTL) period. In some cases, the zero-life parameter can be a defined time offset from the timestamp. In other cases, the zero-life parameter may be based on potential severity or seriousness of a detection event. That is, the zero-effect time defined by the zero-life parameter can be a time offset that is a function of other attributes of the detection event, such as event type and artifacts. For example, a zero-effect time of seven days could be assigned to IDS detection events of highest severity while a zero-effect time of one day could be assigned to IDS detection events of the lowest severity. As another example, a detection event corresponding to visiting a risky website may be associated with a shorter zero-effect time, whereas receiving/downloading information from the risk website may be associated with a longer zero-effect time. Magnitude of a zero-time effects can thus be based on heuristics or historical empirical findings associated with severity of detection events.

Another attribute included in a detection event defines, for example, a group of one or multiple stages of the MITRE ATT&CK framework that may be most likely associated with the detection event. Such a framework includes a common set of tools and techniques used to describe stages of a cyberattack—e.g., Lateral Movement, Command and Control, Exfiltration, and other stages. Analyzer modules that generate detection events can assign a MITRE ATT&CK stage to a detection event that has been generated. The MITRE ATT&CK stage that has been assigned to a detection event may be specific to the detection event. For example, a port scanning analyzer module can monitor port scans, which are related to reconnaissance stage. Similarly, beacon detection corresponds to C2 stage because beacons may be used for command and control. In some cases, an analyzer module can have access to notes made within a signature in order to assign a particular MITRE ATT&CK stage—e.g., the signature provider has already determined such a state based on how the signature has been developed. As another example, in some cases, an analyzer module can assign a particular MITRE ATT&CK stage by using data indicative of an amount and/or direction of traffic (e.g., an amount of upstream traffic or an amount of downstream traffic). An analyzer module can assign one of a first group of multiple MITRE ATT&CK stages to a detection event that analyzer module has generated. Another one of the analyzer modules may assign one of a second group of multiple MITRE ATT&CK stages to a detection event that the other analyzer module has generated. Indeed, each one of the analyzer modules may configured multiple event types that cover various stages of the MITRE ATT&CK framework.

Other attributes can be included in a detection event. For example, one of those other attributes can be a detection count that indicates a number of other detection events of the same event type as the detection event. As another example, another one of those other attributes can be referred to as an evidence attribute and comprises raw log data used to generate the detection event.

By using attributes of detection events, the campaign identification subsystem 116 may systematically and comprehensively compare detection events within a discovery period (e.g., a time period) in order to determine relationships among the detection events. Those relationships can be used to identify a new cyberattack campaign or to update a representation of an existing cyberattack campaign, or both.

The campaign identification subsystem 116 comprises a constructor module 140 that can generate a representation of a cyberattack campaign. The cyberattack campaign may be represented by an undirected temporal graph, which can be referred to as a campaign graph. A temporal graph is a traditional graph having a set of nodes and a set of edges, where an edge exists during a defined time interval. Each node in the campaign graph corresponds to a network entity (e.g., a host or a user account). An edge is present between a first network entity (a node) and a second network entity (another node) in the campaign graph when the first and second network entities share a group of overlapping detection events. An edge can be denoted by $e_{v,u}$ where indices v and u indicate a network entity $E_U$ and a network entity $E_V$, respectively. As mentioned, a detection event can have various attributes comprising a timestamp, a zero-effect time, and a group of artifacts. A first detection event and a second detection event are overlapping detection events when (1) either the first timestamp corresponding to the first detection event indicates a time before the second zero-effect time of the second detection event or the second timestamp corresponding to the second detection event indicates a time before the first zero-effect time of the first detection event, and (2) a first group of artifacts of the first detection event and a second group of artifacts the second detection event share at least one property value. In other words, two detection events are overlapping detection events when both detection events are active at a same time and have an artifact value in common. As an example, two C2 beacon detection events overlap if those detection events occur on respective different hosts with the latter of the two detection events occurring before the zero-effect time of the earlier one of the two detection events and both detection events involving the same external host Internet protocol (IP) address or domain name. It is noted that a cyberattack campaign also may be represented by a directed temporal graph, where each edge in that graph is a directed edge and exists during a defined time interval. Node(s) and directed edge(s) in the directed temporal graph are determined in the same manner as node(s) and edge(s) as is described herein connection with an undirected temporal graph.

The edge between the first network entity and the second network entity exists in the campaign graph from the earliest one of the respective timestamps of the overlapping detection events to the latest one of the respective zero-effect times of the overlapping detection events.

The constructor module 140 may update a representation of a cyberattack campaign periodically, at consecutive time intervals equal to an update period δt. As mentioned, examples of the update period include four hours, six hours, eight hours, 12 hours, or 24 hours. To that end, the constructor module 140 comprises an entity selector component 144 that may access data defining multiple detection events during a discovery period Δt (e.g., a time period), relative to a current analysis time. The data may be accessed from an in-memory storage 150.

The entity selector component 144 may determine, using the multiple detection events, one or more high-interest network entities within the discovery period relative to the current analysis time $T_n$. A high-interest network entity is a network entity that has a risk score that satisfies or exceeds a threshold value at the time $T_n$. The risk score of the network entity is the sum (normalized or otherwise) of respective impact scores, at $T_n$, of all active detection events corresponding to the network entity. That is, the risk score is the net impact score resulting from adding all impact scores of respective detection events that identify the network entity (via the host ID attribute or the user ID attribute, for example) and have an unelapsed zero-effect time at the time $T_n$ of updating a campaign representation. In cases where the risk score is normalized to a value in a range from 0 to 100, example threshold values may include 75, 80, 85, and 90.

The threshold value may be configurable. In some cases, the threshold value may be configured so as to limit the number of cyberattack campaigns that are detected and the number of network entities present in a cyberattack campaign. Additionally, the threshold value may be configured to control the number of computational resources used to detect and track cyberattacks campaigns. Higher threshold values may be overly discriminating and may yield campaign representations that exclude compromised network entities. Lower threshold values may create analysis noise by incorporating moderately compromised network entities. Further, lower threshold values also may yield computationally unwieldy cyberattacks campaigns that may require substantial amounts of computing resource to track. The entity selector component 144 may access the threshold value from the configuration data 118. For example, the configuration data 118, including the threshold value, may be included in a configuration file that the entity selector component 144 accesses at runtime of the constructor module 140.

The constructor module 140 also comprises a generator component 146 that may generate campaign graphs. The generator component 146 may traverse the set of one or multiple high-interest network entities that have been determined within the discovery period, relative to the current analysis time $T_n$, and for each high-interest network entity in that set, the generator component 146 may generate an ephemeral campaign graph. Hence, the generator component 146 generates one or multiple ephemeral campaign graphs. In addition, the generator component 146 generates a campaign ID for each one of the ephemeral campaign graph(s) that have been generated. The campaign ID uniquely identifies an ephemeral campaign graph. For example, the campaign manager component 148 may perform a function call that results in the generation of the campaign ID. The campaign ID can be embodied in a string of numbers, a string of letters, or a string of number and letters. In one example, the campaign ID is a UUID.

Each one of the ephemeral campaign graphs represents a potential cyberattack campaign that is particular to the update period δt, rather than a longer-term cyberattack campaign spanning two or more campaign epochs. The campaign ID of an ephemeral campaign graph serves as an identifier for the potential cyberattack campaign associated with that graph. The number of ephemeral campaign graph (s) that the generator component 146 generates may be the same as or fewer than the number of high-interest network entities that constitute the set of one or multiple high-interest network entities.

Ephemeral cyberattack campaigns are retained in respective data structures 158 (referred to as ephemeral campaigns 158) within an in-memory storage 150. Rapid access to the in-memory storage 150 can permit efficiently performing comprehensive analysis of the ephemeral campaign graphs and associated potential cyberattack campaigns.

To generate an ephemeral campaign graph, the generator component 146 may determine, for a high-interest network entity, one or multiple network entities associated with the high-interest network entity. Determining a particular network entity associated with the high-interest network entity may comprise determining a detection event that is active and identifies, within one or multiple attributes, both the particular network entity and the high-interest network entity. The generator component 146 may determine such a detection event from the detection events 154 retained in the in-memory storage 150. In one example, a network entity $E_J$ is a high-interest network entity within the discovery period (J is an index that identifies the network entity). The generator component 146 can determine multiple detection events that are active and individually identify both $E_J$ and one or more other network entities. Accordingly, the generator component 146 can determine multiple network entities $E_K$, $E_P$, . . . $E_Q$, $E_S$ associated with $E_J$. The indices K, P, . . . Q, and S are distinct from J and from one another, and identify the multiple network entities, respectively. Each detection event of the multiple detection events has one or more attributes identifying $E_J$ or one of $E_K$, $E_P$, . . . $E_Q$, $E_S$. Additionally, each detection event of the multiple detection events can be indexed in terms of the order of an anomalous activity in a sequence of anomalous activities (or hits) involving the network entity identified by the detection event. As such, a detection event can be represented by $h_{p,q}$, where p=J, K, P, . . . Q, S, and q is an index indicating the q-th anomalous activity in the sequence of anomalous activities. In some situations, at least one of the multiple detection events may have a timestamp indicative of an occurrence time outside the discovery period. Such situations may arise when $E_J$ has a detection event within a current discovery period that overlaps with a prior detection event associated with $E_K$, where that prior detection event falls outside the current discovery period.

In addition, as part of generating the ephemeral campaign graph, the generator component 146 may add an edge linking a first node and a second node representing, respectively, a first network entity and a second network entity. Neither the first nor the second network entity is a high-interest network entity, but at least one of those entities may be already a member of the ephemeral campaign graph. The first network entity and the second network entity have overlapping detection events. The generator component 146 may determine overlapping detection events for the first network entity and the second network entity. The first network entity and the second network entity are included in a group of network entities comprising a particular high-interest network entity and one or more network entities associated with the particular high-interest network entity. For each pair of nodes representing respective network entities in that group, the generator component 146 can identify overlapping detection events.

Figure 2:
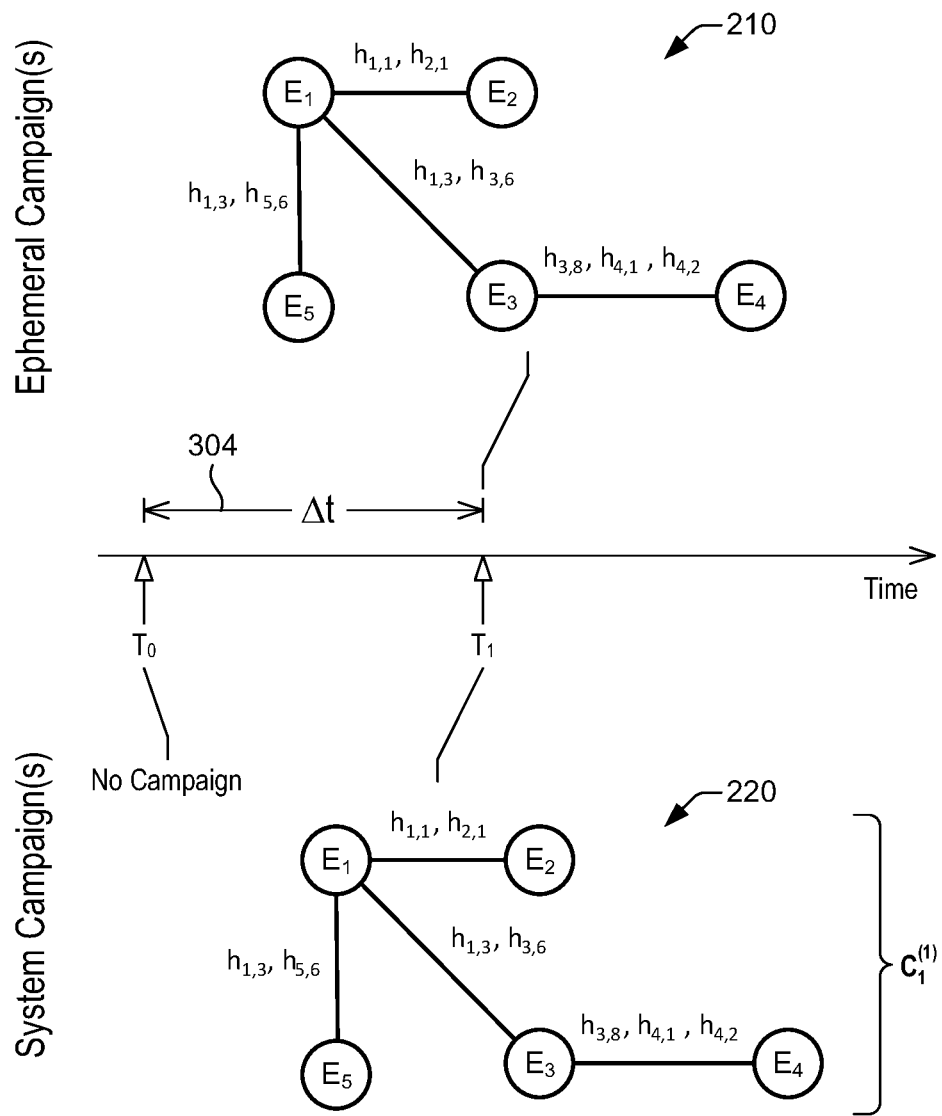
FIG. 2 shows example graph representations of example cyberattack campaigns.

As an example, FIG. 2 shows an ephemeral campaign graph 210 representing a potential cyberattack campaign involving network entities $E_1$, $E_2$, $E_3$, $E_4$, and $E_5$. The ephemeral campaign graph 210 results from analysis of detection events at an analysis time $T_1$, with the discovery period 302 being $\Delta t=24$ hours. In this example, for the sake of simplicity, the update period is considered to be equal to the discovery period. The disclosure is, of course, not bound to such a constraint. Indeed, such a simplifying consideration is made in order to simplify the description of the campaign identification concepts conveyed in this and other examples (such as those illustrated in FIGS. 3A-3B). Additionally, $T_0$ is Jan. 1, 2120, and the entity selector component 144 has determined that $E_1$ is a high-interest network entity. In addition, the generator component 146 determines that network entities $E_2$, $E_3$, $E_4$, and $E_5$ are associated with $E_1$, and it is further assumed that the generator component 146 obtained the detection events shown in Table 1. Accordingly, the generator component 146 can configure five nodes that may form a graph depending on overlapping detection events.

Example timestamps also are shown in Table 1. The timestamps are formatted as a combination of a date and a time-of-day. More specifically, the format of the timestamps conveys time as a six-tuple labeled "date" and including items indicative of year, month, day, hour, minute, and second. The format of the timestamps shown in Table 1 and other tables herein is merely illustrative. Other formats can be contemplated, with each format presenting the timestamp as a time relative to a time origin. For example, in some cases, the timestamp may be formatted as a number of seconds relative to the time origin (e.g., Unix epoch time). The times shown in Table 1 also are illustrative. Other times may be determined by events detected by analyzer modules that supply event data to the data storage 110 (FIG. 1).

TABLE 1

| Detection Event | Timestamp |
| --- | --- |
| $h_{1,1}$ | date(2120, 1, 2, 10, 0, 0) |
| $h_{1,3}$ | date(2120, 1, 2, 10, 32, 0) |
| $h_{2,1}$ | date(2120, 1, 2, 11, 30, 0) |
| $h_{3,6}$ | date(2120, 1, 1, 8, 20, 0) |
| $h_{3,8}$ | date(2120, 1, 2, 9, 25, 0) |
| $h_{4,1}$ | date(2120, 1, 2, 12, 0, 0) |
| $h_{4,2}$ | date(2120, 1, 2, 16, 43, 0) |
| $h_{5,6}$ | date(2120, 1, 2, 15, 13, 0) |

In this example, the generator component 146 determines that $h_{1,1}$ and $h_{2,1}$ are overlapping events for network entity $E_1$ and $E_2$. Hence, the generator component 146 generates an edge linking a node representing network entity $E_1$ and a node representing network entity $E_2$. The generator component 146 also determines that $h_{1,3}$ and $h_{5,6}$ are overlapping events for network entity $E_1$ and network entity $E_5$, and further determines that $h_{1,3}$ and $h_{3,6}$ are overlapping events for network entity $E_1$ and network entity $E_3$. Hence, the generator component 146 generates an edge linking the node representing the network entity $E_1$ and a node representing the network entity $E_5$, and an edge linking the node representing the network entity $E_1$ and a node representing the network entity $E_3$. Further, the generator component 146 determines that $h_{3,8}$, $h_{4,1}$, and $h_{4,2}$ are overlapping events for the network entity $E_3$ and the network entity $E_4$. Hence, the generator component 146 generates an edge linking a node representing the network entity $E_3$ and a node representing the network entity $E_4$.

As mentioned, a node in a campaign graph exists in the cyberattack campaign during a period that extends from the earliest detection event to the latest detection event associated with any edge of the node. Accordingly, as is shown in Table 2, the generator component 146 configures a start time and an end time for each one of the nodes in the ephemeral campaign graph 210.

TABLE 2

| Node | Start Time | End Time |
| --- | --- | --- |
| $E_1$ | date(2120, 1, 1, 8, 20, 0) | date(2120, 1, 2, 10, 32, 0) |
| $E_2$ | date(2120, 1, 2, 10, 0, 0) | date(2120, 1, 2, 11, 30, 0) |
| $E_3$ | date(2120, 1, 1, 8, 20, 0) | date(2120, 1, 2, 16, 43, 0) |
| $E_4$ | date(2120, 1, 2, 9, 25, 0) | date(2120, 1, 2, 16, 43, 0) |
| $E_5$ | date(2120, 1, 2, 10, 32, 0) | date(2120, 1, 2, 15, 13, 0) |

Because the ephemeral campaign graph 210 is the only graph created by the generator component 148, the campaign manager module 146 configures the ephemeral campaign graph 210 as an active campaign graph representative of an active cyberattack campaign and retains the graph in the data storage 130, within a data structure of the data structures 138 (referred to as system campaigns 138) within the data storage 130. Such an active cyberattack campaign is denoted by $C_1^{(1)}$ in FIG. 2, where C denotes said campaign, the subscript indexes the cyberattack campaign as an initial active campaign, and the superscript "(·)" indexes the current campaign epoch of the cyberattack campaign and adopts the value "(1)" to represent initial campaign epoch.

As part of configuring the active cyberattack campaign, the campaign manager module 146 may generate campaign metadata defining various campaign attributes for the active cyberattack campaign. The campaign manager module 146 retains the configured metadata in the data storage 130, within campaigns 138. As part of generating campaign metadata, the campaign manager module 146 may assign the campaign ID (e.g., a UUID) of the ephemeral campaign graph 210 to the active cyberattack campaign. Additionally, the campaign manager module 146 may generate a campaign name. In some cases the campaign name may include, or may otherwise be based on, the campaign ID. The campaign manager module 146 may generate a list of the network entities included in the active cyberattack campaign, and also may generate a parameter indicative of the number of network entities included in the active cyberattack campaign. The campaign manager module 146 can further generate a parameter indicative of a start time of the active cyberattack campaign, and a second parameter defining a TTL period for the active cyberattack campaign. The TTL period (which may be referred to as campaign TTL) defines a time interval during which the campaign identification subsystem 116 monitors the evolution of the active cyberattack campaign. The campaign manager module 146 can further generate a data structure, such as table, that includes start time and end time of each network entity included in the active cyberattack campaign.

The campaign manager module 148 also generates state values of various status variables that may be included in the campaign metadata. A first status variable may identify a last update time (or last analysis time). A second status variable may identify if updates to the active cyberattack campaign have been stopped.

The campaign manager module 148 also may generate an attribute indicative of a campaign status and/or a parameter indicative of campaign type. Campaign status and campaign type, individually or in combination, may determine the manner of monitoring the cyberattack campaign. For example, a campaign status can be Inactive and, thus, further updates to the cyberattack campaign are no longer implemented. As another example, the campaign status may be Active and, thus, updates to the cyberattack campaign may continue to be implemented. As yet another example, the campaign type may be Declared and, thus, updates may continue to be implemented on an on-going basis as long as the campaign status is Active. A Declared campaign may be referred to as a system campaign and may be retained in the data storage 130, within one of the data structures 138. A Declared cyberattack campaign may be retained within data storage 130 indefinitely even when the Declared cyberattack campaign is no longer Active. Further, a Declared cyberattack campaign may be exempt from limits on the number of discovery periods over which the cyberattack campaign is updated. A further example of campaign type is Potential. A Potential cyberattack campaign also may be referred to as a system campaign and may be retained in the data storage 130. Further, a Potential cyberattack campaign may continue to be updated until the campaign TTL has elapsed. A Potential cyberattack campaign may be remove from the data storage 130 after the campaign TTL has elapsed. In some cases, campaign status and/or campaign type may be interactively configured, using input data received from a computing device external to the campaign identification subsystem 116.

There are cases where multiple potential cyberattack campaigns are identified within an update period δt. At least one of the multiple potential cyberattack campaign may be related to another potential cyberattack campaign during the discovery period. Potential cyberattack campaigns that have a network entity in common are related. Duplication is a particular form of relationship among a first potential cyberattack campaign and a second potential cyberattack campaign.

The constructor module 140 comprises a campaign manager component 148 that may compare multiple potential cyberattack campaigns to one another to determine if a particular potential cyberattack campaign is related to or a duplicate of another potential cyberattack campaign. The campaign manager component 148 may compare first nodes present in an ephemeral campaign graph representing the particular potential cyberattack campaign to second nodes present in a second ephemeral campaign graph representing another potential cyberattack campaign of the multiple potential cyberattack campaigns. Comparing the first nodes to the second nodes may comprise comparing first entity IDs of respective ones of the first nodes and second entity IDs of respective ones of the second nodes. In some cases, based on comparing the first nodes to the second nodes, the campaign manager component 148 may determine that the first nodes and the second nodes share at least one node and also include distinct nodes. In other words, the particular potential cyberattack campaign and the other potential cyberattack campaign have one or more network entities in common, and are not a duplicate of one another. Thus, the campaign manager component 148 may determine that the particular potential cyberattack campaign and that other potential cyberattack campaign are related to one another, but are not a duplicate of one another. In scenarios where the first nodes and the second nodes are the same, the campaign manager component 148 may determine that the particular potential cyberattack campaign and that other potential cyberattack campaign are duplicates of one another.

The campaign manager component 148 may delete one of a pair of potential cyberattack campaigns that have been determined to be duplicates of one another. Additionally, the campaign manager component 148 may merge a pair of potential cyberattack campaigns that have been determined to be related, but not a duplicate of one another. To that end, the campaign manager component 148 may incorporate (i) attributes corresponding to overlapping detection events and (ii) the ephemeral campaign graph of the latter one of the pair of potential cyberattack campaigns into the earlier one of the pair of potential cyberattack campaigns. The campaign manager component 148 can update the ephemeral campaign graphs to remove the earlier of the one of the pair of corresponding potential cyberattack campaigns. As such, the ephemeral campaigns 158 represent respective ephemeral cyberattack campaigns that are disjointed (or unique).

The campaign manager component 148 may then compare the ephemeral campaigns 158 to one or more active cyberattack campaigns within campaigns 138 retained in the data storage 130. In some cases, based on such a comparison, the campaign manager component 148 can update an active cyberattack campaign. Updating the active cyberattack campaign comprises merging a potential cyberattack campaign and the active cyberattack campaign. The potential cyberattack campaign and the active cyberattack campaign have respective campaign graphs comprising at least one particular node in common. Updating the active cyberattack campaign also comprises updating edge start time(s) and edge stop time(s) accordingly. Such a merger and the updated edge start and stop time(s) time yield an updated campaign graph that represents the updated active cyberattack campaign. The updated campaign graph is a representation of the updated active cyberattack campaign up until a current analysis time. The most recent campaign epoch of updated active cyberattack campaign is represented by the potential cyberattack campaign involved in the merger.

In addition, or in other cases, based on the comparison of the ephemeral campaigns 158 to one or more active cyberattack campaigns within the campaigns 138, the campaign manager component 146 may identify a particular potential cyberattack campaign having an ephemeral campaign graph that lacks node(s) in common with campaign graphs representing, respectively, the one or more active cyberattack campaigns. The campaign manager component 146 may configure the particular potential cyberattack campaign as a new active cyberattack campaign. The campaign manager component 146 may add the new active cyberattack campaign to the campaigns 138.

Continuing with the example described in connection with FIG. 2, data defining detection events over a next discovery period 304 (FIG. 3A) can be analyzed at a next iteration of campaign identification, at a time $T_2$. In that example, the cyberattack campaign $C_1^{(1)}$ may have evolved in one of a number of ways. In one scenario (referred to as Scenario I, simply for the sake of nomenclature), the entity selector component 144 determines that the network entity $E_1$ remains a high-interest network entity and a network entity $E_A$ also is a high-interest network entity. Further, the generator component 146 determines that detection events $h_{1,1}$, $h_{4,2}$, and $h_{5,6}$ are inactive because the respective zero-effect times of those events are before or equal to $T_1$. The generator component 146 also determines that network entities $E_3$ and $E_4$ are associated with network entity $E_1$, and further determines that network entities $E_B$ and $E_C$ are associated with network entity $E_A$. Accordingly, the generator component 146 can configure six nodes that may form two ephemeral campaign graphs (one for $E_1$ and one for $E_A$) depending on overlapping detection events.

In Scenario I, generator component 146 may have obtained the detection events shown in Table 3, which detection event are active during the next discovery period 304.

TABLE 3

| Detection Event | Timestamp |
| --- | --- |
| $h_{1,3}$ | date(2120, 1, 2, 10, 32, 0) |
| $h_{3,6}$ | date(2120, 1, 1, 8, 20, 0) |
| $h_{3,8}$ | date(2120, 1, 2, 9, 25, 0) |
| $h_{4,1}$ | date(2120, 1, 2, 12, 0, 0) |
| $h_{4,6}$ | date(2020, 1, 3, 2, 05, 0) |
| $h_{B,1}$ | date(2120, 1, 3, 6, 14, 0) |
| $h_{C,2}$ | date(2120, 1, 3, 22, 17, 0) |

In a first ephemeral campaign graph 310 (FIG. 3A) of the two ephemeral campaign graphs, the generator component 146 determines that $h_{1,3}$ and $h_{3,6}$ remain overlapping detection events for the network entity $E_1$ and network entity $E_3$. Hence, the generator component 146 generates an edge linking the node representing the network entity $E_1$ and a node representing the network entity $E_3$. Additionally, the generator component 146 determines that $h_{3,8}$ and $h_{4,1}$ remain overlapping detection events for the network entity $E_3$ and the network entity $E_4$. Hence, the generator component 146 generates an edge linking a node representing the network entity $E_3$ and a node representing the network entity $E_4$. Because $h_{4,2}$ is no longer active, the edge linking network entities E3 and E4 in the first graph 310 is different from the edge linking network entities E3 and E4 in $C_1^{(1)}$ (FIG. 2).

The first ephemeral campaign graph 310 represents a potential cyberattack campaign $C_1^*$. Here, the notation $C_k^*$ indicates a disjoint ephemeral campaign originating from high-interest network entity $E_k$. A node in $C_1^*$ exists during a period that extends from the earliest detection event to the latest detection event associated with any edge of the node. Accordingly, as is shown in Table 3, the generator component 148 configures a start time and an end time for each one of the nodes in the ephemeral campaign graph 310.

TABLE 3

| Node | Start Time | End Time |
| --- | --- | --- |
| $E_1$ | date(2120, 1, 1, 8, 20, 0) | date(2120, 1, 2, 10, 32, 0) |
| $E_3$ | date(2120, 1, 1, 8, 20, 0) | date(2120, 1, 2, 12, 0, 0) |
| $E_4$ | date(2120, 1, 2, 9, 25, 0) | date(2120, 1, 2, 12, 0, 0) |

In a second ephemeral campaign graph 320 (FIG. 3A) of the two ephemeral campaign graphs, the generator component 146 determines that $h_{4,6}$ and $h_{B,1}$ are overlapping detection events for the network entity $E_A$ and network entity $E_B$. Hence, the generator component 146 generates an edge linking the node representing the network entity $E_A$ and a node representing the network entity $E_B$. Additionally, the generator component 146 determines that $h_{4,6}$ and $h_{C,2}$ are overlapping events for the network entity $E_A$ and the network entity $E_C$. Hence, the generator component 146 generates an edge linking the node representing the network entity $E_A$ and a node representing the network entity $E_C$.

The second ephemeral campaign graph 320 represents a potential cyberattack campaign $C_A^*$. A node in the second ephemeral campaign graph 320 exists during a period that extends from the earliest detection event to the latest detection event associated with any edge of the node. Accordingly, as is shown in Table 4, the generator component 146 configures a start time and an end time for each one of the nodes in the ephemeral campaign graph 320.

TABLE 4

| Node | Start Time | End Time |
| --- | --- | --- |
| $E_A$ | date(2120, 1, 3, 2, 05, 0) | date(2120, 1, 3, 22, 17, 0) |
| $E_B$ | date(2120, 1, 3, 2, 05, 0) | date(2120, 1, 3, 6, 14, 0) |
| $E_C$ | date(2120, 1, 3, 2, 05, 0) | date(2120, 1, 3, 22, 17, 0) |

The potential cyberattack campaign $C_1^*$ is related to $C_1^{(1)}$. Thus, the campaign manager component 148 merges $C_1^*$ with $C_1^{(1)}$, resulting in an updated cyberattack campaign $C_1^{(2)}$ (where the superscript "(2)" denotes a subsequent epoch (or episode) of the cyberattack campaign C). The merger may be accomplished by merging the ephemeral campaign graph 310 with the active campaign graph 220 (FIG. 2), and updating start times and end times accordingly. The active campaign graph 330 represents the updated cyberattack campaign $C_1^{(2)}$. The campaign manager component 148 may retain the updated cyberattack campaign $C_1^{(2)}$ within the campaigns 138. Due to the respective occurrence times of detection events shown in Table 3, nodes in the active campaign graph 330 have same start time and end time as those shown in Table 2.

The potential cyberattack campaign $C_A^*$ is a newly identified campaign. The campaign manager component 148 retains $C_A^*$ as an active cyberattack campaign $C_2^{(2)}$. The active campaign graph 340 represents the active cyberattack campaign $C_2^{(2)}$.

Further continuing with the example described in connection with FIG. 2, in another scenario (referred to as Scenario II, simply for the sake of nomenclature), the entity selector component 144 determines that the network entity $E_1$ remains a high-interest network entity and the network entity $E_A$ also is a high-interest network entity. Further, as in Scenario I, the generator component 146 determines that detection events $h_{1,1}$, $h_{4,2}$, and $h_{5,6}$ are inactive because the respective zero-effect times of those events are before or equal to $T_1$. The generator component 146 also determines that network entities $E_3$ and $E_4$ are associated with network entity $E_1$, and further determines that network entities $E_B$ and $E_5$ are associated with network entity $E_A$. Accordingly, as in Scenario I, the generator component 146 can configure six nodes that may form two ephemeral campaign graphs (one for $E_1$ and one for $E_A$) depending on overlapping detection events.

In Scenario II, the generator component 146 has obtained the detection events shown in Table 5, which detection events are active during the next discovery period 304.

TABLE 5

| Detection Event | Timestamp |
| --- | --- |
| $h_{1,3}$ | date(2120, 1, 2, 10, 32, 0) |
| $h_{3,6}$ | date(2120, 1, 1, 8, 20, 0) |
| $h_{3,8}$ | date(2120, 1, 2, 9, 25, 0) |
| $h_{4,1}$ | date(2120, 1, 2, 12, 0, 0) |
| $h_{4,6}$ | date(2020, 1, 3, 2, 05, 0) |
| $h_{B,1}$ | date(2120, 1, 3, 6, 14, 0) |
| $h_{5,8}$ | date(2120, 1, 3, 21, 07, 0) |

In a first ephemeral campaign graph 350 (FIG. 3B) of the two ephemeral campaign graphs, the generator component 146 determines that $h_{1,3}$ and $h_{3,6}$ remain overlapping detection events for the network entity $E_1$ and the network entity $E_3$. Hence, the generator component 146 generates an edge linking the node representing the network entity $E_1$ and a node representing the network entity $E_3$. Additionally, the generator component 146 determines that $h_{3,8}$ and $h_{4,1}$ remain overlapping detection events for the network entity $E_3$ and the network entity $E_4$. Hence, the generator component 146 generates an edge linking a node representing the network entity $E_3$ and a node representing the network entity $E_4$. Because $h_{4,2}$ is no longer active in Scenario II, the edge linking network entities E3 and E4 in the first ephemeral campaign graph 350 is different from the edge linking network entities E3 and E4 in $C_1^{(1)}$ (FIG. 2).

The first ephemeral campaign graph 350 represents a potential cyberattack campaign $C_1^*$. A node in $C_1^*$ exists during a period that extends from the earliest detection event to the latest detection event associated with any edge of the node. Accordingly, as is shown in Table 6, the generator component 148 configures a start time and an end time for each one of the nodes in the ephemeral campaign graph 350. Note that in Scenario II, it is contemplated that network entities associated with network entity $E_1$ and overlapping events among those network entities are the same as in Scenario I. Therefore, the times shown in Table 6 coincide with the times shown in Table 5.

TABLE 6

| Node | Start Time | End Time |
| --- | --- | --- |
| $E_1$ | date(2120, 1, 1, 8, 20, 0) | date(2120, 1, 2, 10, 32, 0) |
| $E_3$ | date(2120, 1, 1, 8, 20, 0) | date(2120, 1, 2, 12, 0, 0) |
| $E_4$ | date(2120, 1, 2, 9, 25, 0) | date(2120, 1, 2, 12, 0, 0) |

In a second ephemeral campaign graph 360 (FIG. 3B) of the two ephemeral campaign graphs, the generator component 146 determines that $h_{A,6}$ and $h_{B,1}$ are overlapping detection events for the network entity $E_A$ and network entity $E_B$. Hence, the generator component 146 generates an edge linking the node representing the network entity $E_A$ and a node representing the network entity $E_B$. Additionally, the generator component 146 determines that $h_{A,6}$ and $h_{5,8}$ are overlapping events for the network entity $E_A$ and the network entity $E_5$. Hence, the generator component 146 generates an edge linking the node representing the network entity $E_A$ and a node representing the network entity $E_5$.

The second ephemeral campaign graph 360 represents a potential cyberattack campaign $C_A^*$. A node in second ephemeral campaign graph 360 exists during a period that extends from the earliest detection event to the latest detection event associated with any edge of the node. Accordingly, as is shown in Table 7, the generator component 146 configures a start time and an end time for each one of the nodes in the second ephemeral campaign graph 360.

TABLE 7

| Node | Start Time | End Time |
| --- | --- | --- |
| $E_A$ | date(2120, 1, 3, 2, 05, 0) | date(2120, 1, 3, 22, 17, 0) |
| $E_B$ | date(2120, 1, 3, 2, 05, 0) | date(2120, 1, 3, 6, 14, 0) |
| $E_5$ | date(2120, 1, 3, 2, 05, 0) | date(2120, 1, 3, 21, 07, 0) |

Figure 3A:
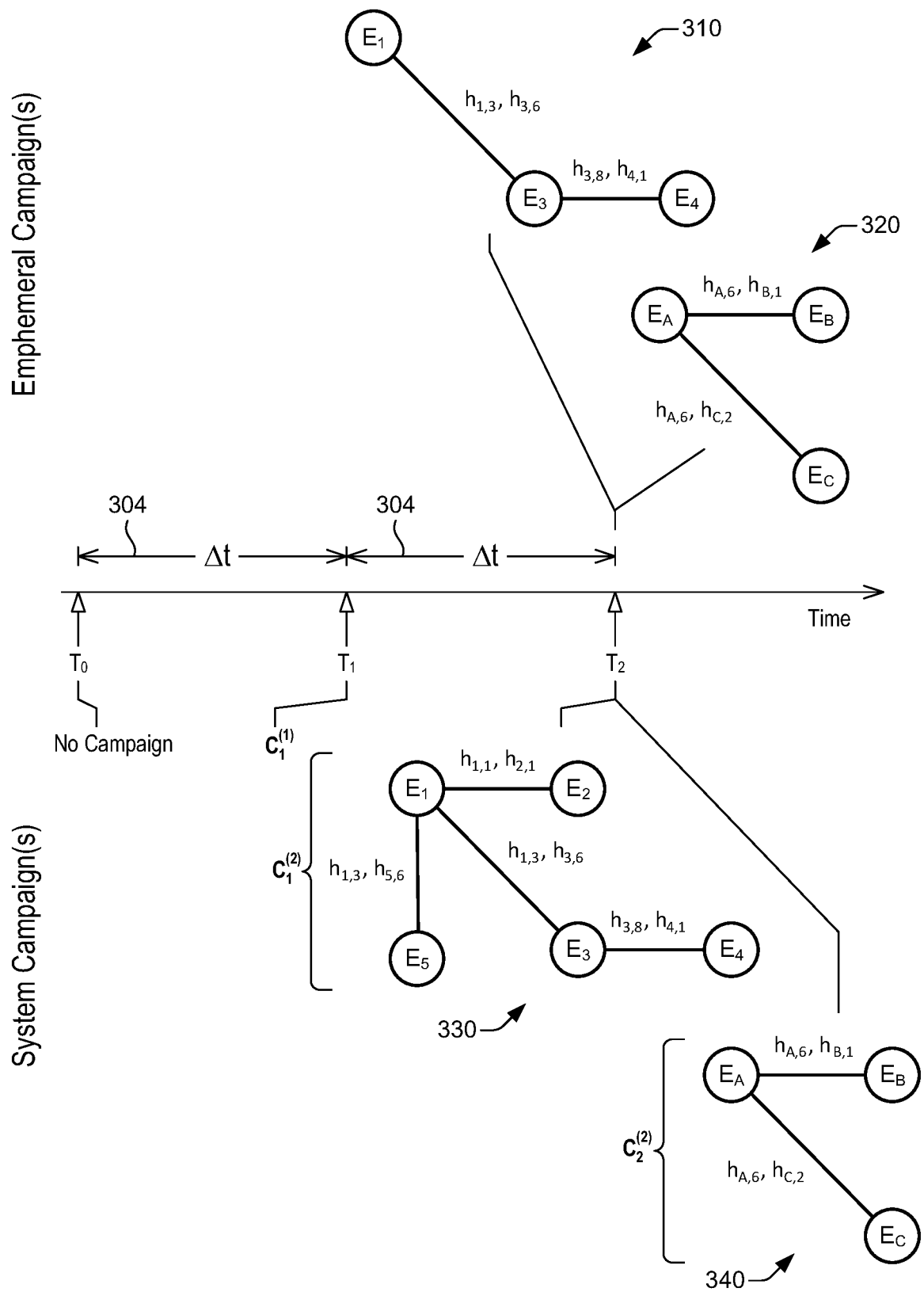
FIG. 3A shows other example graph representations of example cyberattack campaigns.
Figure 3B:
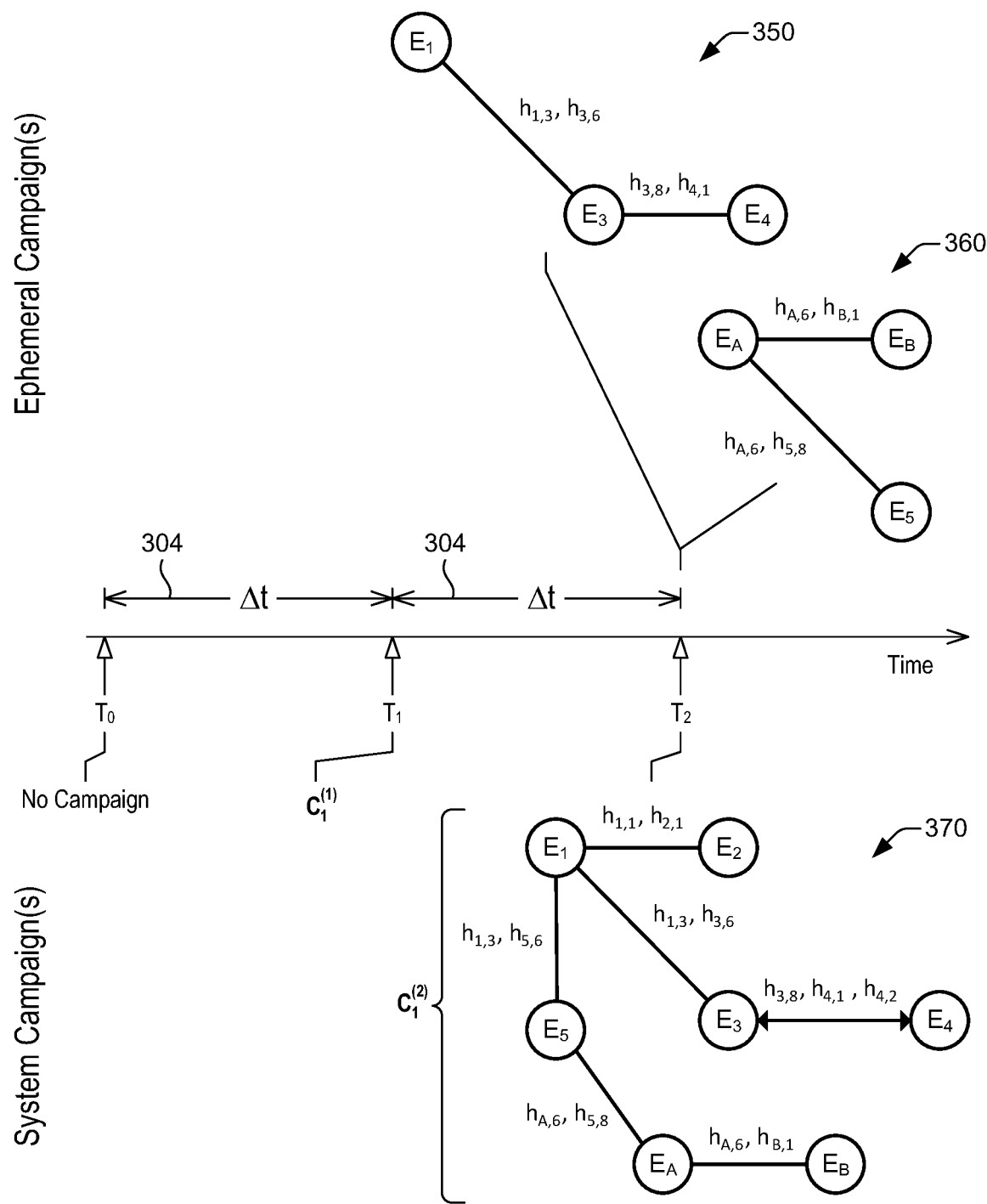
FIG. 3B shows other example graph representations of example cyberattack campaigns.

Potential cyberattack campaigns $C_1^*$ and $C_A^*$ are related to one another and to $C_1^{(1)}$, via network entity $E_5$. Accordingly, the campaign manager component 148 merges both $C_1^*$ and $C_A^*$ with $C_1^{(1)}$, resulting in an updated cyberattack campaign $C_1^{(2)}$. The merger may be accomplished by merging the ephemeral campaign graph 350 and the ephemeral campaign graph 360 with the active campaign graph 220 (FIG. 2), and updating start times and end times accordingly. The active campaign graph 370 shown in FIG. 3B represents the updated cyberattack campaign $C_1^{(2)}$. The campaign manager component 148 may retain the updated cyberattack campaign $C_1^{(2)}$ within the campaigns 138. Due to the respective occurrence times of detection events shown in Table 5, nodes in the active campaign graph 370 have same start and end times shown in Table 8.

TABLE 8

| Node | Start Time | End Time |
| --- | --- | --- |
| $E_1$ | date(2120, 1, 1, 8, 20, 0) | date(2120, 1, 2, 10, 32, 0) |
| $E_2$ | date(2120, 1, 2, 10, 0, 0) | date(2120, 1, 2, 11, 30, 0) |
| $E_3$ | date(2120, 1, 1, 8, 20, 0) | date(2120, 1, 2, 16, 43, 0) |
| $E_4$ | date(2120, 1, 2, 9, 25, 0) | date(2120, 1, 2, 16, 43, 0) |
| $E_5$ | date(2120, 1, 2, 10, 32, 0) | date(2120, 1, 2, 15, 13, 0) |
| $E_A$ | date(2120, 1, 3, 2, 05, 0) | date(2120, 1, 3, 21, 07, 0) |
| $E_B$ | date(2120, 1, 3, 2, 05, 0) | date(2120, 1, 3, 6, 14, 0) |

Because of the association between $E_A$ and $E_5$, the end time of the node representing the network entity $E_5$ (see Table 5) is updated relative to the end time of the node representing network entity $E_5$ in active cyberattack campaign $C_1^{(1)}$ (see Table 2).

Further continuing with the example described in connection with FIG. 2, in yet another scenario (referred to as Scenario III, simply for the sake of nomenclature), the entity selector component 144 determines that the network entity $E_1$ remains a high-interest network entity and that the network entity $E_3$ also is a high-interest network entity. Further, as in Scenario I and Scenario II, the generator component 146 determines that detection events $h_{1,1}$, $h_{4,2}$, and $h_{5,6}$ are inactive because the respective zero-effect times of those events are before or equal to $T_1$. The generator component 146 also determines that network entities $E_1$ and $E_3$ are associated with each other, and each one of $E_1$ and $E_3$ also are associated with $E_4$, $E_A$, and $E_5$. In other words, the network entities associated with $E_3$ form complete overlap to $E_1$. Accordingly, as in Scenario I, the generator component 146 can configure five nodes that may form two ephemeral campaign graphs (one for $E_1$ and one for $E_3$) depending on overlapping detection events. However, because of such complete overlap, the two ephemeral campaign graphs are duplicates of one another. Accordingly, the campaign manager component 148 deletes one of such graphs, resulting in a single graph representative of a single ephemeral campaign.

In Scenario III, the generator component 146 may have obtained the detection events shown in Table 9, which detection events are active during the next discovery period 304.

TABLE 9

| Detection Event | Timestamp |
|---|---|
| $h_{1,3}$ | date(2120, 1, 2, 10, 32, 0) |
| $h_{3,6}$ | date(2120, 1, 1, 8, 20, 0) |
| $h_{3,8}$ | date(2120, 1, 2, 9, 25, 0) |
| $h_{4,1}$ | date(2120, 1, 2, 12, 0, 0) |
| $h_{4,9}$ | date(2020, 1, 3, 2, 05, 0) |
| $h_{5,8}$ | date(2120, 1, 3, 21, 07, 0) |

In an ephemeral campaign graph 380 (FIG. 3C) of the two ephemeral campaign graphs, the generator component 146 determines that $h_{1,3}$ and $h_{3,6}$ remain overlapping detection events for the network entity $E_1$ and the network entity $E_3$. Hence, the generator component 146 generates an edge linking the node representing the network entity $E_1$ and a node representing the network entity $E_3$. Additionally, the generator component 146 determines that $h_{3,8}$ and $h_{4,1}$ remain overlapping detection events for the network entity $E_3$ and the network entity $E_4$. Hence, the generator component 146 generates an edge linking a node representing the network entity $E_3$ and a node representing the network entity $E_4$. Because $h_{4,2}$ is no longer active in Scenario III, the edge linking network entities $E_3$ and $E_4$ in the ephemeral campaign graph 380 is different from the edge linking network entities $E_3$ and $E_4$ in $C_1^{(1)}$ (FIG. 2). Further, the generator component 146 determines that $h_{3,6}$ and $h_{4,9}$ are overlapping detection events for the network entity $E_3$ and the network entity $E_4$. Hence, the generator component 146 generates an edge linking the node representing the network entity $E_3$ and a node representing the network entity $E_4$. Such an edge is absent in the active campaign graph 220 (FIG. 2). Furthermore, the generator component 146 determines that $h_{3,6}$ and $h_{5,8}$ are overlapping detection events for the network entity $E_3$ and the network entity $E_5$. Hence, the generator component 146 generates an edge linking the node representing the network entity $E_3$ and a node representing the network entity $E_5$. Such an edge also is absent in the active campaign graph 220 (FIG. 2).

The ephemeral campaign graph 380 represents a potential cyberattack campaign $C_1^*$. A node in $C_1^*$ exists during a period that extends from the earliest detection event to the latest detection event associated with any edge of the node. Accordingly, as is shown in Table 10, the generator component 148 configures a start time and an end time for each one of the nodes in the ephemeral campaign graph 380.

TABLE 10

| Node | Start Time | End Time |
|---|---|---|
| $E_1$ | date(2120, 1, 1, 8, 20, 0) | date(2120, 1, 3, 21, 07, 0) |
| $E_3$ | date(2120, 1, 1, 8, 20, 0) | date(2120, 1, 3, 21, 07, 0) |
| $E_4$ | date(2120, 1, 2, 9, 25, 0) | date(2120, 1, 2, 12, 0, 0) |
| $E_5$ | date(2120, 1, 1, 8, 20, 0) | date(2120, 1, 3, 21, 07, 0) |
| $E_4$ | date(2120, 1, 1, 8, 20, 0) | date(2120, 1, 3, 2, 05, 0) |

Figure 3C:
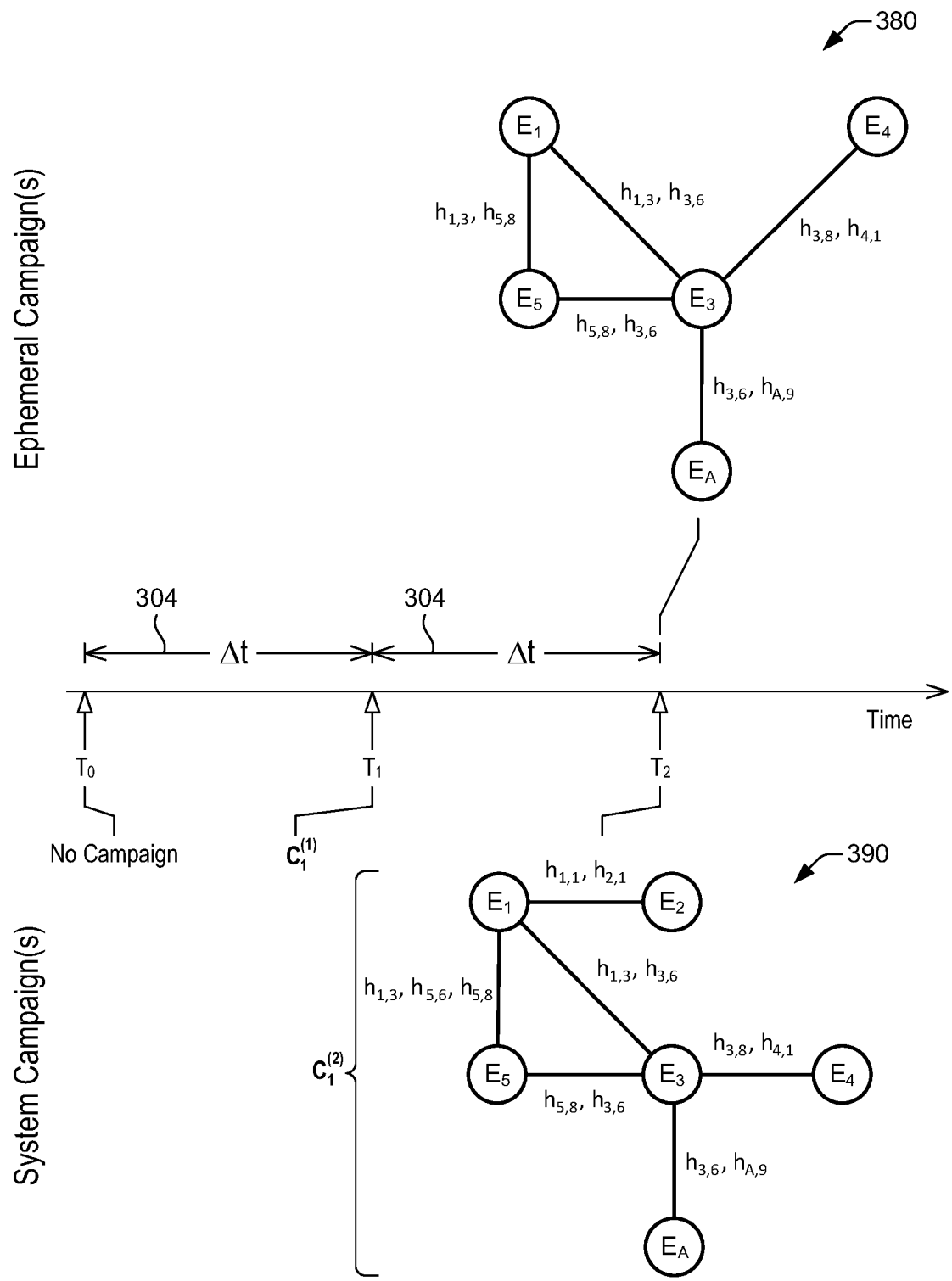
FIG. 3C shows other example graph representations of example cyberattack campaigns.

The campaign manager component 148 merges $C_1^*$ with $C_1^{(1)}$, resulting in an updated cyberattack campaign $C_1^{(2)}$. The merger may be accomplished by merging the ephemeral campaign graph 380 with the active campaign graph 220 (FIG. 2), and updating start times and end times accordingly. The active campaign graph 390 shown in FIG. 3C represents the updated cyberattack campaign $C_1^{(2)}$. The campaign manager component 148 may retain the updated cyberattack campaign $C_1^{(2)}$ within the campaigns 138. Due to the respective occurrence times of detection events shown in Table 10, nodes in the active campaign graph 390 have start time and end time shown in Table 11.

TABLE 11

| Node | Start Time | End Time |
|---|---|---|
| $E_1$ | date(2120, 1, 1, 8, 20, 0) | date(2120, 1, 3, 21, 07, 0) |
| $E_2$ | date(2120, 1, 2, 10, 0, 0) | date(2120, 1, 2, 11, 30, 0) |
| $E_3$ | date(2120, 1, 1, 8, 20, 0) | date(2120, 1, 3, 21, 07, 0) |
| $E_4$ | date(2120, 1, 2, 9, 25, 0) | date(2120, 1, 2, 16, 43, 0) |
| $E_5$ | date(2120, 1, 1, 8, 20, 0) | date(2020, 1, 3, 21, 07, 0) |
| $E_4$ | date(2120, 1, 1, 8, 20, 0) | date(2120, 1, 3, 2, 05, 0) |

Because of the association between $E_1$ and $E_5$ and the additional detection event $h_{5,8}$ relative to the detection events in active cyberattack campaign $C_1^{(1)}$, the end time of the node representing the network entity $E_1$ is updated (see Table 11) relative to the end time of the node representing network entity $E_1$ in the active cyberattack campaign $C_1^{(1)}$ (see Table 2). Further, because of the association between $E_4$ and $E_3$, the end time of the node representing the network entity $E_3$ is updated (see Table 11) relative to the end time of the node representing network entity $E_3$ in active cyberattack campaign $C_1^{(1)}$ (see Table 2).

The campaign identification subsystem 116 also may comprise an interface module 160 that may supply data identifying at least a subset of the campaigns 138 and/or other data identifying a particular cyberattack campaign and temporal evolution thereof. The data and the other data can be referred to as campaign data. The interface module 160 may supply such campaign data to a client device 170. The campaign data may be supplied in numerous ways. As an example, the interface module 160 can send such campaign data to the client device 170 via a network 165 (represented by an open arrow in FIG. 1). The network 165 may comprise wired link(s) and/or wireless link(s) and several network elements (such as routers or switches, concentrators, servers, and the like) that form a communication architecture having a defined footprint. The network 165 may be embodied in a local area network (LAN), a metropolitan area network (MAN), a wide area network (WAN), or a combination thereof. As another example, the interface module 160 may retain the campaign data in one or more memory devices (not shown in FIG. 1) and may configure an interface, such as an API, to permit access to the stored campaign data via a function call. The client device 170 may access the campaign data programmatically by executing the function call. The client device 170 may be embodied in, for example, a server device, a personal computer (PC), a laptop computer, a tablet computer, or a smartphone.

Figure 4A:
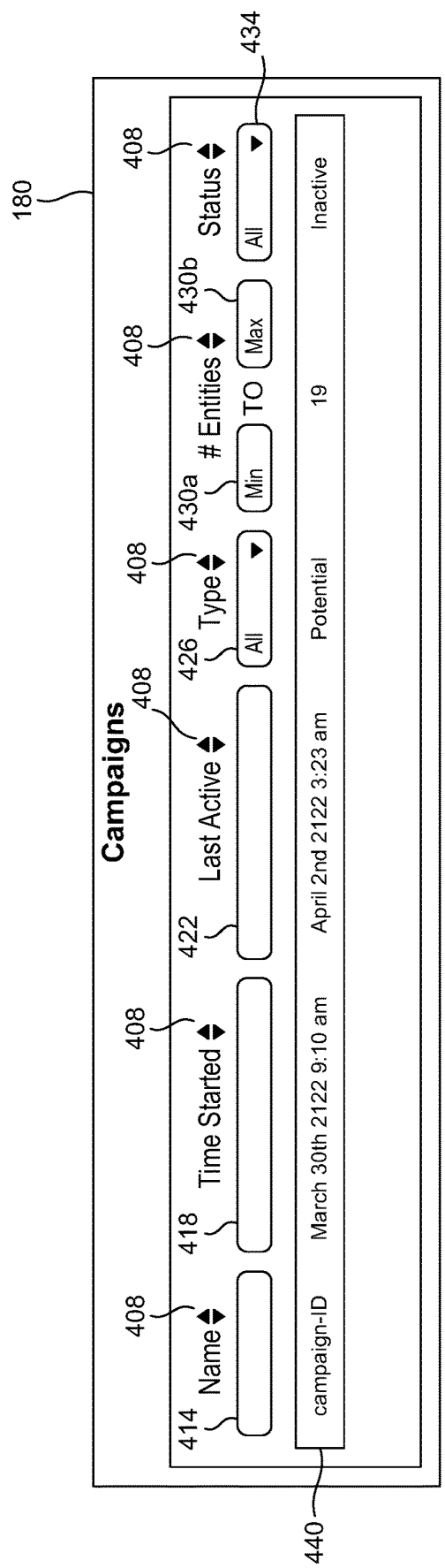
FIG. 4A shows an example user interface.

The client device 170 may present at least a portion of the campaign data received from the interface module 160. An analyst reviewing cyberattack campaigns and respective temporal evolutions can consume or otherwise access such campaign data by providing input data that may control presentation of at least a portion of the campaign data. The interface module 160 may cause or otherwise direct the client device 170 to present a user interface 180 (UI 180). The user interface 180 may be one of multiple user interfaces that may be presented by the client device 170 at the direction of the interface module 160, for example. For example, the client device 170 may execute a software application to present the user interface 180 as is shown in FIG. 4A. That user interface 180 may be referred to as a Selection view and includes multiple selectable UI elements that permit selecting a particular cyberattack campaign. To that end, the multiple selectable UI element may identify respective fields corresponding to table that retains that data identifying campaigns. Accordingly, the multiple selectable UI elements may include a selectable UI element 414 corresponding to a Name field. The selectable UI element 414 permits selecting a name of the particular cyberattack campaign to be accessed. The multiple selectable UI elements also may include a selectable UI element 418 corresponding to a Time Started field. The selectable UI element 418 permits selecting a desired start time of the cyberattack campaign to be reviewed. The multiple selectable UI elements also may include a selectable UI element 422 corresponding to a Last Active field. The selectable UI element 422 permits selecting a desired last active time of the cyberattack campaign to be reviewed. The multiple selectable UI elements also may include a selectable UI element 426 corresponding to a Type field. The selectable UI element 426 permits selecting a desired type (e.g., Potential or Declared) of the cyberattack campaign to be reviewed. The multiple selectable UI elements also may include a selectable UI element 430a and a selectable UI element 430b that permit selecting a desired range for a Number of Entities field specifying a number of network entities involved in the cyberattack campaign to be reviewed. The multiple selectable UI elements also may include a selectable UI element 434 corresponding to a Status field. The selectable UI element 434 permits selecting a desired status (e.g., Active or Inactive) of the cyberattack campaign to be reviewed. As is shown in FIG. 4A, the user interface 180 can include selectable indicia 408 adjacent to each one of the multiple selectable UI elements. The selectable indicia 408 permits perusing and selecting available values for a particular field.

After values of the fields included in the UI 180 in FIG. 4A have been configured, the client device 170 may send a query to the interface module 160, where the query includes query criteria defined by respective values of the fields that have been configured. The interface module 160 can resolve the query and, in response, can send data identifying one or more campaigns that satisfy the query. The client device 170 can receive the data and can present a selectable UI element 440 that identifies a cyberattack campaign by name, e.g., "campaign-ID", where "ID" may be an alphanumeric code (e.g., a UUID). The selectable UI element 440 also includes indicia identifying attributes of that cyberattack campaign. The cyberattack campaign identified by the selectable UI element 440 is one of the cyberattack campaigns 138.

Figure 4B:
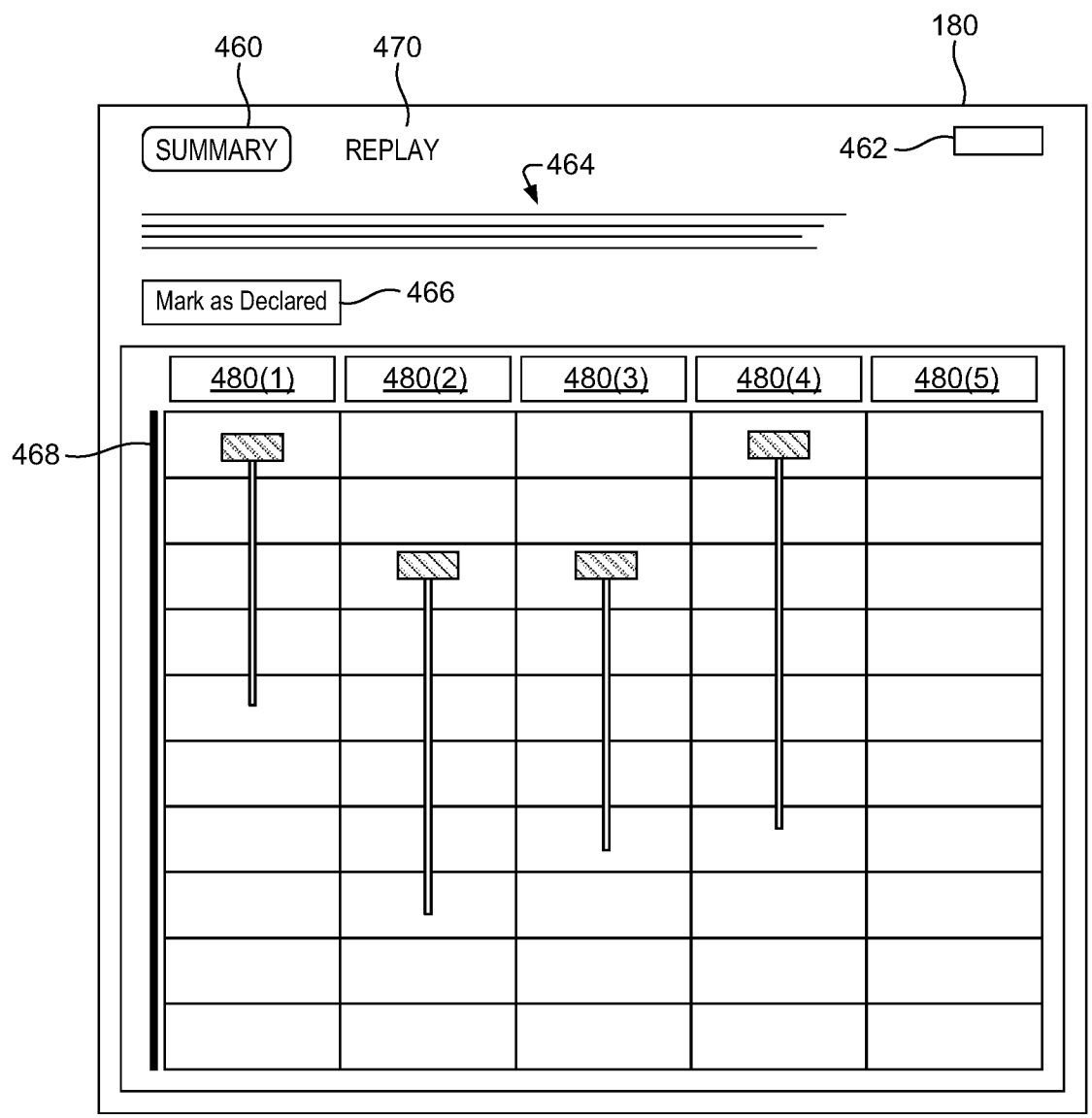
FIG. 4B shows an example user interface.

Selection of the selectable UI element 440 may cause the client device 170 to present the user interface 180 shown in FIG. 4B. That user interface 180 shown in FIG. 4B provides a Summary view of the cyberattack campaign identified in the selectable UI element 440. Thus, the user interface 180 may summarize campaign attributes and dynamics of detection events within a cyberattack campaign. As such, the user interface 180 comprises a visual element 462 identifying a campaign type and also comprises a summary 464 of select campaign attributes of the cyberattack campaign. As is described herein, the campaign type may be one of Potential or Declared. The select campaign attributes may include, for example, start time of the campaign; last active time of the campaign; number of unique detection events associated with the cyberattack campaign; number of network entities included in the campaign; number of a particular type of network entity included in the campaign (such as number of user account, number of client devices, and/or number of hosts). The summary 464 may include a brief description providing context for the cyberattack campaign.

The user interface 180 shown in FIG. 4B also comprises a selectable visual element 466 that permits defining a campaign attribute interactively. More specifically, the selectable visual element 466 permits configuration of a defined campaign type for the cyberattack summarized by the user interface 180. As is described herein, the campaign type (e.g., Potential or Declared) determines the manner of monitoring the cyberattack campaign. Selection of the selectable visual element 466 may cause the client device 170 to send, to the interface module 160, input data indicative of the selection of the selectable visual element 466. As mentioned, the interface module 160 may configure, based on the input data, a campaign attribute of the existing cyberattack campaign to the campaign type (e.g., Declared).

The user interface 180 shown in FIG. 4B further comprises a UI element 468 representative of a timeline of detection events for a cyberattack campaign. The cyberattack campaign can be an inactive cyberattack campaign, an active cyberattack campaign, or a declared cyberattack campaign. Regardless of type of campaign, the timeline spans a finite time interval extending from the start time of the cyberattack campaign to either an end time of the cyberattack campaign (inactive case) or the last active time of the cyberattack campaign (active case). That finite time interval can be referred to as the lifespan of the cyberattack campaign. The timeline may be discretized according to multiple temporal bins that cover the entire lifespan of the cyberattack campaign. Individual temporal bins or a combination of consecutive temporal bins need not coincide with a campaign epoch of the cyberattack campaign. In one example, the timeline can be uniformly partitioned, with each temporal bin spanning a defined time interval that is common across the multiple temporal epochs. The time interval spanned by a time bin may be configured to provide satisfactory discretization of the timeline based on formatting factors, such as display area available for the UI 180. The interface module 160 may configure the time bins and may provide formatting data defining a size of the time bins relative to the size of the UI element 468. As is shown in FIG. 4B, the UI 180 comprises several rows of multiple blocks representing the multiple time bins. Those rows are arranged in succession, parallel to one another. Each row is arranged parallel to the UI element 468.

In some cases, each one of the blocks representing respective time bins can be selectable. Selection of one of those blocks can permit interactively configuring a size of the time bin represented by the block. In that way, a particular time range of the timeline of detection events for a cyberattack campaign may be selected and zoomed in to visualize in greater detail the evolution of the cyberattack campaign. Selection of a block can be accomplished by different types of interactions with the UI 180 shown in FIG. 4B depending on display resources available to the client device 170. An interaction can include a click-and-move interaction, a multi-touch gestures (such as a pinch-to-zoom gesture), or similar activity.

Further, the user interface 180 shown in FIG. 4B includes multiple second UI elements, including UI element 480(1), UI element 480(2), UI element 480(3), UI element 480(4), and UI element 480(5). Each one of those second UI elements represents a stage of the multiple stages of the MITRE ATT&CK framework. Each one of the multiple second UI elements is associated with a row of multiple blocks representing the multiple time intervals that form the timeline of a cyberattack campaign. Accordingly, the user interface 180 may comprise one or more other UI elements (represented by hatched blocks) indicative of respective detection events. For those detection events, a visual element (an open rectangle) is shown to summarize the number of unique network entities, user accounts, and external hosts involved in those detection events. The one or more other UI elements may overlay respective blocks, each corresponding to a time interval identified by a timestamp of a detection event and being associated with a stage of the MITRE ATT&CK framework identified by the appropriate attribute of the detection event. In that way, the UI interface 180 shown in FIG. 4A may readily summarize the dynamics of suspicious activities that form a cyberattack campaign.

Figure 5A:
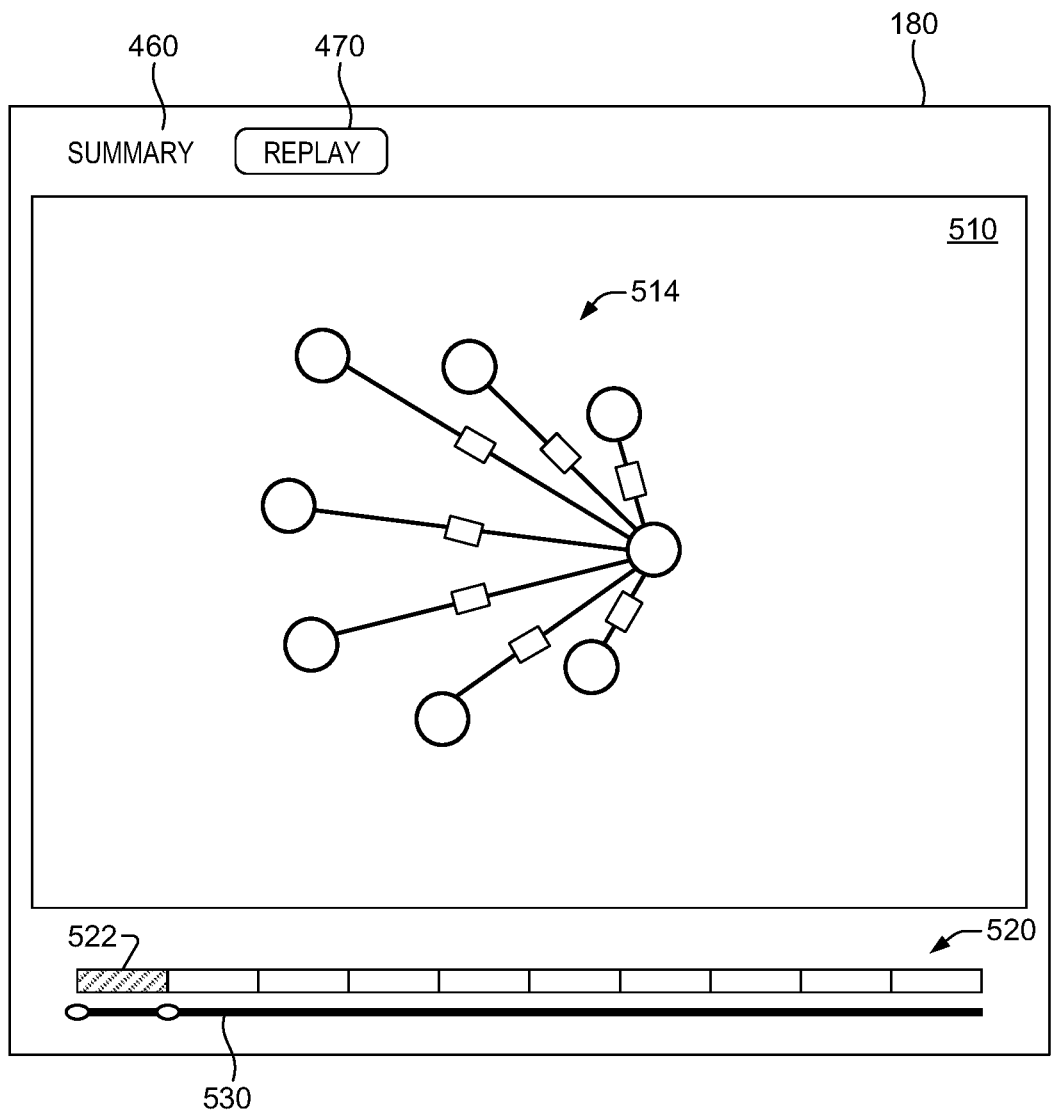
FIG. 5A shows another example user interface.

In other cases, as is shown in FIG. 5A, the user interface 180 may convey the temporal evolution of a cyberattack campaign by presenting campaign graphs corresponding to respective temporal epochs that discretize the lifespan of the cyberattack campaign. Thus, that UI 180 can be referred to as a Playback view. The client device 170 may be caused to present the user interface 180 shown in FIG. 5A in response to selection of the selectable visual element 470 in the user interface 180 shown in FIG. 4B. In some configurations, the client device 170 may be caused to present the user interface shown in FIG. 5A in response to selection of the selectable visual element 440 in the user interface 180 shown in FIG. 4A. In other configurations, the client device 170 may be caused to present the user interface shown in FIG. 5A in response to selection of another selectable visual element (not shown in FIG. 4A) that may be adjacent, for example, to the selectable visual element 440. The campaign graphs can be presented individually (as a still image) or in succession, at a defined playback rate. The playback rate may be configurable by an end-user, in some cases. For purposes of illustration, the playback rate can be configured in terms of a number of temporal epochs per second. Examples of the number of temporal epochs that can be configured include one, two, and four. By presenting campaign graphs successively across a portion of the lifespan of the cyberattack campaign, a form of playback of the cyberattack campaign may be achieved. Not only is that type of playback unavailable in existing technologies, but that playback also may readily convey the propagation of a breach within a computer network, for example.

More specifically, the user interface 180 shown in FIG. 5A comprises a viewing pane 510 where a campaign graph can be presented. That user interface 180 also comprises a UI element 530 representative of a lifespan of a cyberattack campaign. The cyberattack campaign can be an inactive cyberattack campaign, an active cyberattack campaign, or a declared cyberattack campaign. Regardless of type of campaign, the timeline spans a finite time interval extending from the start time of the cyberattack campaign to an end time or last active time of the cyberattack campaign. As in Summary view (FIG. 4A), the timeline represented by the UI element 530 may be discretized according to temporal epochs spanning a configurable time interval. Thus, the user interface 180 shown in FIG. 5 comprises multiple selectable blocks 520, each corresponding to a temporal epoch.

Selection of a particular selectable block or blocks of the multiple selectable blocks 520 results in the selection of a particular set of detection events that occurred during the span of the selected block(s). Indeed, such a selection applies a filter to edges and nodes present in the temporal graph representing a cyberattack. Because each edge in the temporal graph has a start time and an end time, the client device 170 can present the edge in case the edge exists within the time interval corresponding to the selected block or blocks. Similarly, because each node in the temporal graph has a start time and an end time, the client device 170 can present the node in case the node exists within the time interval corresponding to the selected block or blocks. Selection can be accomplished by an interaction with the selectable visual element. The interaction can include one of a mouse click, a mouse hover, a screen swipe, a screen tap, a screen touch for a defined time interval, a gesture, or similar activity. Responsive to such a selection, that particular block can be redrawn with hatching or other distinctive markings. Further, responsive to such a selection, a campaign graph corresponding to the selected campaign epoch can be presented in the viewing pane 510. As is shown in FIG. 5A, block 522 has been selected. That selected block corresponds to the initial campaign epoch in the cyberattack campaign. Such selection causes the presentation of the campaign graph 514 in the viewing pane 510. Each node in the campaign graph 514 is represented by a visual element (an open circle in FIG. 5A). Each of those visual elements may be further formatted to indicate a type of network entity represented by the visual element. Further, blocks overlaying respective edges in the graph 514 are also shown. Each one of the blocs represents a group of MITRE ATT&CK stages corresponding to overlapping detection events for a pair of network entities linked by an edge. Each one of such blocks may comprise a marking (not sown in FIG. 5A) indicative of a cyberattack technique involving one or more of and first network entity and second network entity linked by an edge. The cyberattack technique may correspond to a stage of the MITRE ATT&CK framework.

In some cases, one or more of the visual elements that compose the campaign graph 514 can be selectable. Selection of a visual element of such visual element(s) can cause the client device 170 to present additional information and/or permit deletion of the selected visual elements, for example. Accordingly, in those cases, the campaign graph 514 may be interactively edited. Particular edits may be based on heuristics and/or empirical criteria, for example.

The user interface 180 shown in FIG. 5A also includes the selectable visual element 460, which may cause the client device 170 to present the Summary view in response to being selected. Although not shown in FIG. 5A, the user interface 180 also may include a selectable element that, in response, to being selected, may cause the client device 170 to present the Selection view shown in FIG. 4A.

Figure 5B:
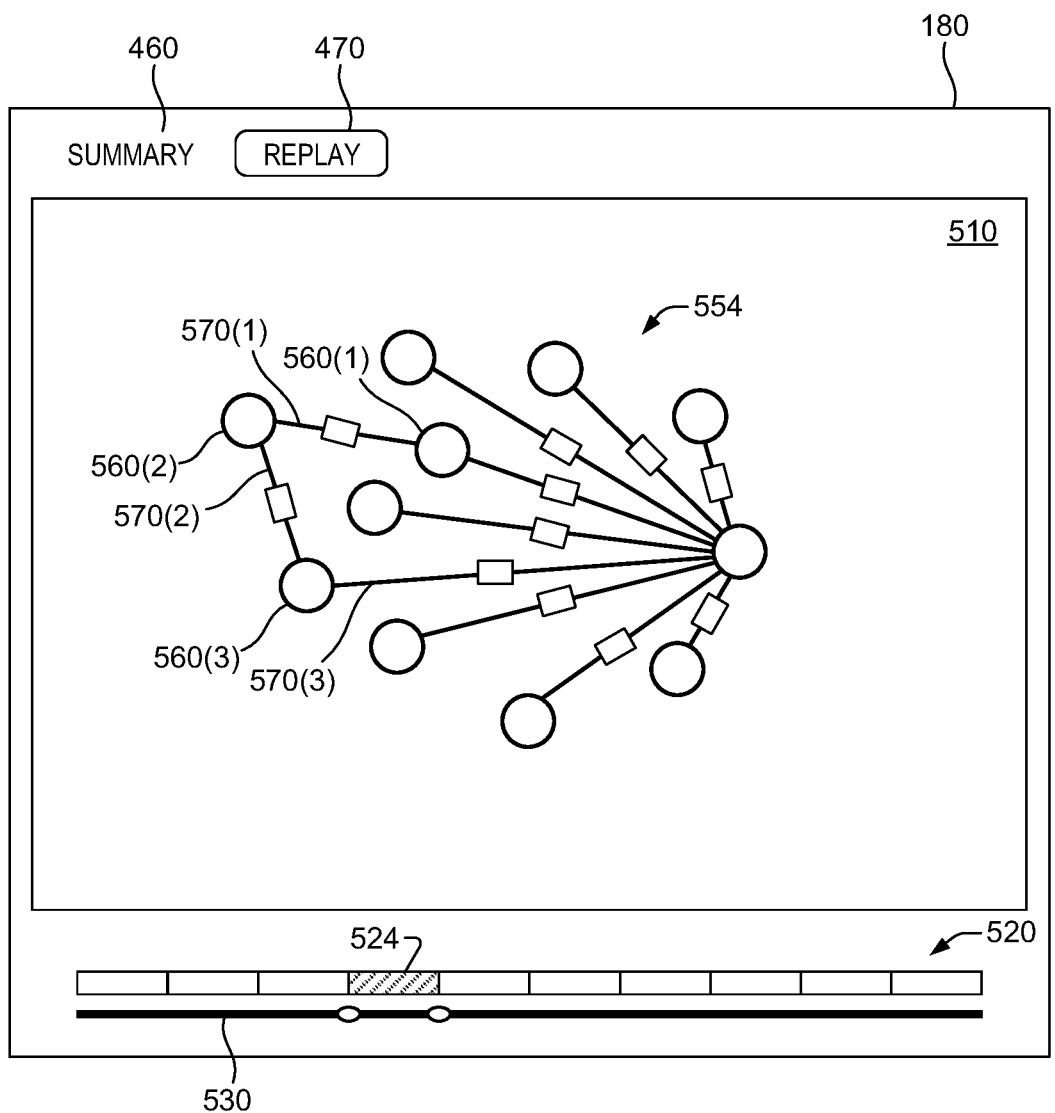
FIG. 5B shows another example user interface.

Because other campaign time bins are available for selection at the user interface 180 shown in FIG. 5A, the client device 170 (FIG. 1) may redraw the user interface 180 in response to selection of another one of the multiple selectable blocks 520. As is shown in FIG. 5B, selection of the selectable block 524 can cause presentation of a campaign graph 554 representing the fourth campaign epoch of the cyberattack campaign. Each node in the campaign graph 554 is represented by a visual element (an open circle in FIG. 5B). Each of those visual elements may be further formatted to indicate a type of network entity represented by the visual element. The campaign graph 554 reveals changes indicative of how the cyberattack campaign has evolved since start time (e.g., initial campaign epoch). The changes includes addition of nodes and edges. Specifically, a first node 560(1), a second node 560(2), and a third node 560(3) have been added as the result of the cyberattack campaign continuing to propagate in the computer network being targeted by malicious activity. Additionally, a first edge 570(1), a second edge 570(2), and a third edge 570(3) have been added as the result of the cyberattack campaign. Respective groups of MITRE ATT&CK stages for those edges also are shown as blocks overlaying respective edges. Each one of such blocks may comprise a marking (not shown in FIG. 5B) indicative of a cyberattack technique involving one or more of and first network entity and second network entity linked by an edge. The larger size of campaign graph 554 relative to campaign graph 514 may indicate that the cyberattack campaign has expanded in scope, affecting additional network entities, for example.

In some cases, one or more of the visual elements that compose the campaign graph 554 can be selectable. Selection of a visual element of such visual element(s) may cause the client device 170 to present additional information and/or permit deletion of the selected visual elements, for example. Accordingly, in those cases, the campaign graph 554 may be interactively edited. Particular edits may be based on heuristics and/or empirical criteria, for example.

The user interface 180 shown in FIG. 5B also includes the selectable visual element 460, which may cause the client device 170 to present the Summary view in response to being selected. Although not shown in FIG. 5B, the user interface 180 also may include a selectable element that, in response, to being selected, may cause the client device 170 to present the Selection view shown in FIG. 4A.

Figure 6A:
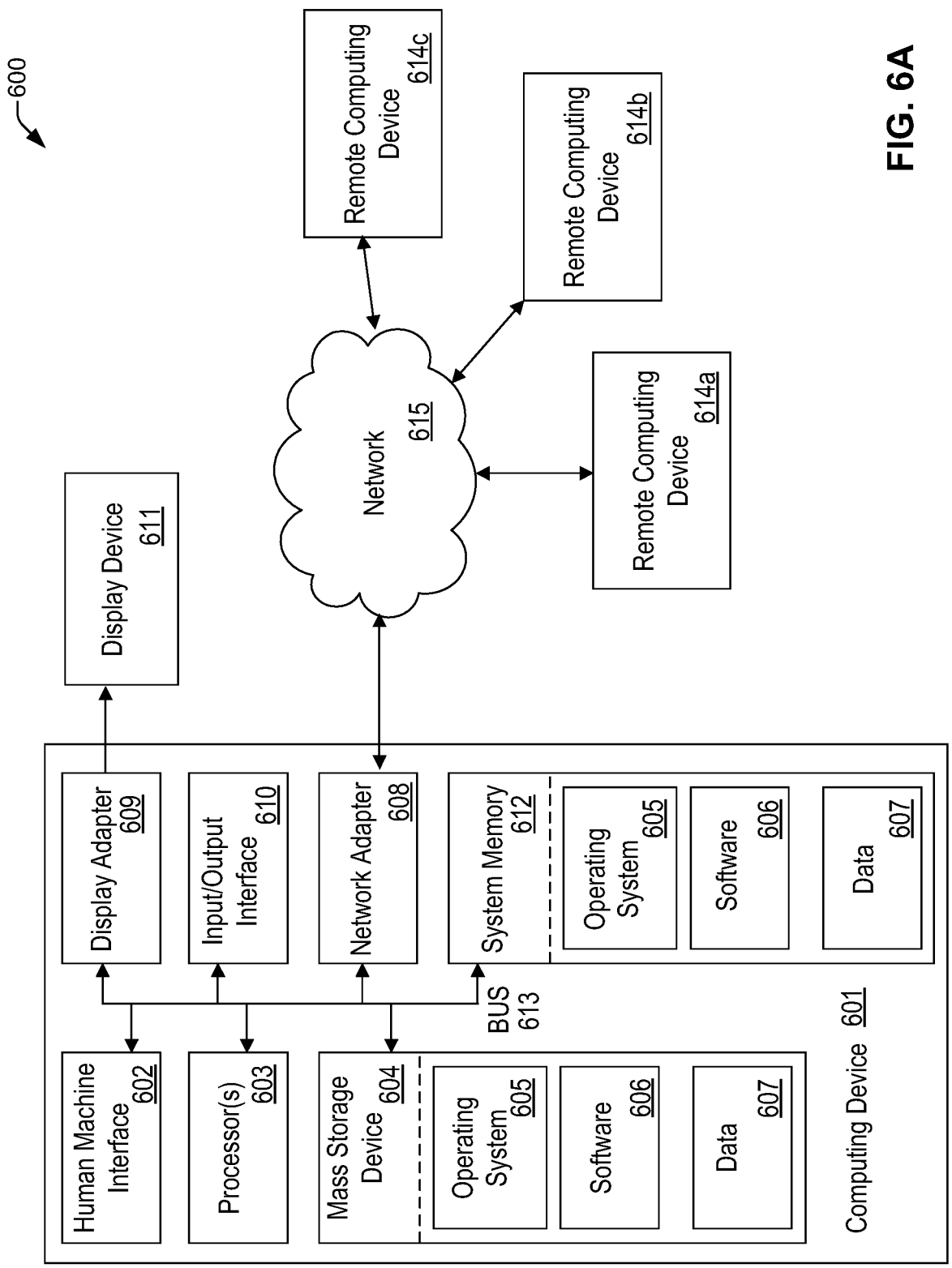
FIG. 6A shows an example a computing system to identify cyberattack campaigns.

Identification of cyberattack campaigns and other functionalities described herein may be implemented on the computing system 600 shown in FIG. 6A and described below. The computer-implemented methods and systems disclosed herein may utilize one or more computing devices to perform one or more functions in one or more locations. FIG. 6A is a block diagram depicting an example computing environment 600 for performing the disclosed methods and/or implementing the disclosed systems. The computing system 600 is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment. The computing system 600 shown in FIG. 6A may embody at least a portion of the example computing system 100 (FIG. 1), or other computing systems described herein, and may implement the various functionalities described herein in connection with identification of cyberattack campaigns. For example, one or more of the computing devices shown in the computing system 600 may comprise the ingestion module 120, the constructor module 140, the interface module 160, the data storage 130, and the in-memory storage 150 shown in FIG. 1.

The computer-implemented methods and systems in accordance with this disclosure may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed computer-implemented methods and systems may be performed by software components. The disclosed systems and computer-implemented methods may be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, the systems and computer-implemented methods disclosed herein may be implemented via a general-purpose computing device in the form of a computing device 601. The components of the computing device 601 may comprise one or more processors 603, a system memory 612, and a system bus 613 that couples various system components including the one or more processors 603 to the system memory 612. The system may utilize parallel computing.

The system bus 613 represents one or more of several possible types of bus structures, including a memory bus or memory controller, a peripheral bus, an accelerated graphics port, or local bus using any of a variety of bus architectures. The bus 613, and all buses specified in this description may also be implemented over a wired or wireless network connection and each of the subsystems, including the one or more processors 603, a mass storage device 604, an operating system 605, software 606, data 607, a network adapter 608, the system memory 612, an Input/Output interface 610, a display adapter 609, a display device 611, and a human-machine interface 602, may be contained within one or more remote computing devices 614a,b,c at physically separate locations, connected through buses of this form, in effect implementing a fully distributed system.

The computing device 601 typically comprises a variety of computer-readable media. Exemplary readable media may be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the data 607 and/or program modules such as the operating system 605 and the software 606 that are immediately accessible to and/or are presently operated on by the one or more processors 603. For example, the software 606 may comprise the ingestion module 120 (FIG. 1), the constructor module 140 (FIG. 1) and the interface module 160 (FIG. 1). The operating system 605 may be embodied in one of Windows operating system, Unix, or Linux, for example.

In another aspect, the computing device 601 may also comprise other removable/non-removable, volatile/non-volatile computer storage media. For example, FIG. 6 illustrates the mass storage device 604 which may provide non-volatile storage of computer code, computer readable instructions, data structures, program modules, and other data for the computing device 601. For example and not meant to be limiting, the mass storage device 604 may be a hard disk, a removable magnetic disk, a removable optical disk, magnetic cassettes or other magnetic storage devices, flash memory cards, compact disc read-only memory (CD-ROM), digital versatile disks (DVD) or other optical storage, random access memories (RAM), read only memories (ROM), electrically erasable programmable read-only memory (EEPROM), and the like.

Optionally, any number of program modules may be stored on the mass storage device 604, including by way of example, the operating system 605 and the software 606. Each of the operating system 605 and the software 606 (or some combination thereof) may comprise elements of the programming and the software 606. The data 607 may also be stored on the mass storage device 604. The data 607 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems. The software 306 may comprise, for example, ingestion module 120 (FIG. 1), the constructor module 140 (FIG. 1) and the interface module 160 (FIG. 1).

In another aspect, the user may enter commands and information into the computing device 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the one or more processors 603 via the human-machine interface 602 that is coupled to the system bus 613, but may be connected by other interface and bus structures, such as a parallel port, game port, an Institute of Electrical and Electronics Engineers (IEEE) 1394 Port (also known as a Firewire port), a serial port, or a universal serial bus (USB).

In yet another aspect, the display device 611 may also be connected to the system bus 313 via an interface, such as the display adapter 609. It is contemplated that the computing device 601 may have more than one display adapter 609 and the computing device 601 may have more than one display device 611. For example, the display device 611 may be a monitor, an LCD (Liquid Crystal Display), or a projector. In addition to the display device 611, other output peripheral devices may comprise components such as speakers (not shown) and a printer (not shown) which may be connected to the computing device 601 via the Input/Output Interface 610. Any operation and/or result of the methods may be output in any form to an output device. Such output may be any form of visual representation, including, but not limited to, textual, graphical, animation, audio, tactile, and the like. Although shown as being separate from the computing device 601, the display device 611 and computing device 601 may be part of one device in some cases.

The computing device 601 may operate in a networked environment using logical connections to one or more remote computing devices 614*a,b,c*. For example, a remote computing device may be a personal computer, portable computer, smartphone, a server device, a router device, a network computer, a peer device or other common network node, and so on. Logical connections between the computing device 601 and a remote computing device 614*a,b,c* may be made via a network 615, such as a LAN and/or a general WAN. Such network connections may be through the network adapter 608. The network adapter 608 may be implemented in both wired and wireless environments. In some cases, a remote computing device of the remote computing devices 614*a,b,c* may embody the client device 170 (FIG. 1). Thus, the network 315 may embody, or may constitute, for example, the network 165.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the software 306 may be stored on or transmitted across some form of computer-readable media. Any of the disclosed methods may be performed by computer readable instructions embodied on computer-readable media. Computer-readable media may be any available media that may be accessed by a computer. By way of example and not meant to be limiting, computer-readable media may comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Figure 6B:
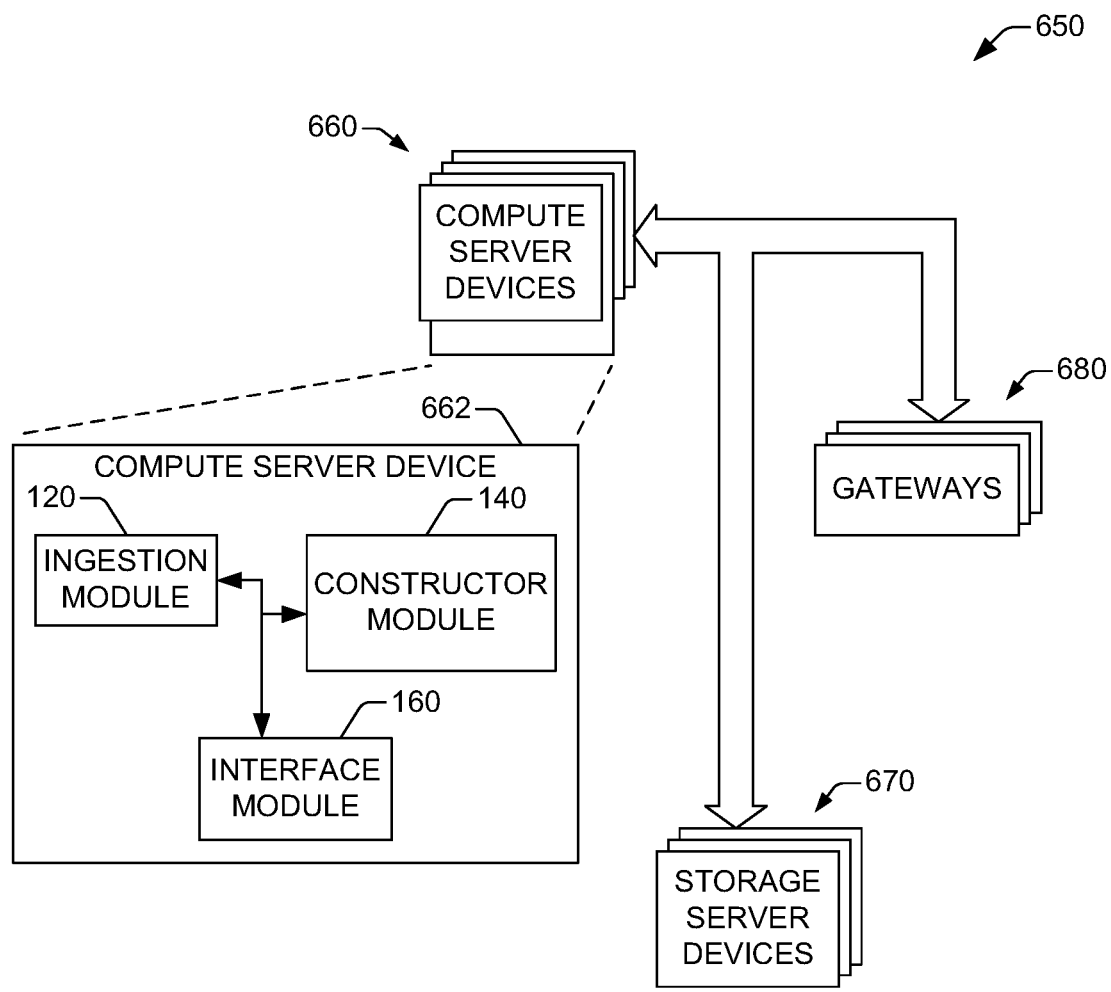
FIG. 6B shows an example of a computing system to identify cyberattack campaigns.

Identification of cyberattack campaigns, visualization of a cyberattack campaign, and other functionalities described herein also may be implemented on the computing system 650 shown in FIG. 6B and described below. The computing system 650 can embody, or can include, the campaign identification subsystem 116 (FIG. 1).

The example computing system 650 may include two types of server devices: Compute server devices 660 and storage server devices 670. A subset of the compute server devices 660, individually or collectively, can host the various modules that permit implementing identification of cyberattack campaigns and other functionalities in accordance with aspects described herein. Thus, such a subset of compute server device 660 can operate in accordance with functionality described herein in connection with identification of cyberattack campaigns and visualization thereof, for example. The subset of compute server devices can be configured as part of a virtual private cloud (VPC). For the sake of illustration, a particular compute server device 662 within such a subset is schematically depicted as hosting such modules—e.g., the ingestions module 120, the constructor module 140, and the interface module 160. Similar to the computing device 601 (FIG. 6A), the architecture of the compute server device 662 comprises one or more processors, one or more memory devices, and a bus architecture that functionally couples such components. The modules hosted by the compute server device 662 can be stored in at least one of the memory device(s). At least one other server device of the compute server devices 310 can host the in-memory storage 150 (FIG. 1). The other server device(s) also can be configured as part of a virtual private cloud (VPC).

Further, at least the subset of the compute server devices 660 can be functionally coupled to one or many of the storage server devices 670. That coupling can be direct or can be mediated by at least one of gateway devices 680. The storage server devices 670 include data and/or metadata that can be used to implement the functionality described herein in connection with identification of cyberattack campaigns and visualization thereof, for example. Some or all of the storage server devices 670 can embody, or can include, the data storage 130 (FIG. 1).

Each one of the gateway devices 680 can include one or many processors functionally coupled to one or many memory devices that can retain application programming interfaces (APIs) and/or other types of program code for access to the compute server devices 660 and storage server devices 670. Such access can be programmatic, via an appropriate function call, for example. The subset of the compute server devices 660 that host the ingestions module 120, the constructor module 140, and the interface module 160 also can use API(s) supplied by the gateway devices 680 in order to access the VPC that hosts the in-memory storage 150 (FIG. 1).

In view of the aspects described herein, example methods that may be implemented in accordance with the disclosure can be better appreciated with reference, for example, to the flowcharts in FIGS. 7-11. For purposes of simplicity of explanation, the example method disclosed herein is presented and described as a series of blocks (with each block representing an action or an operation in a method, for example). However, it is to be understood and appreciated that the disclosed method is not limited by the order of blocks and associated actions or operations, as some blocks may occur in different orders and/or concurrently with other blocks from those that are shown and described herein. For example, the various methods in accordance with this disclosure may be alternatively represented as a series of interrelated states or events, such as in a state diagram. Furthermore, not all illustrated blocks, and associated action(s), may be required to implement a method in accordance with one or more aspects of the disclosure. Further yet, two or more of the example methods (and any other methods disclosed herein) may be implemented in combination with each other.

Figure 7:
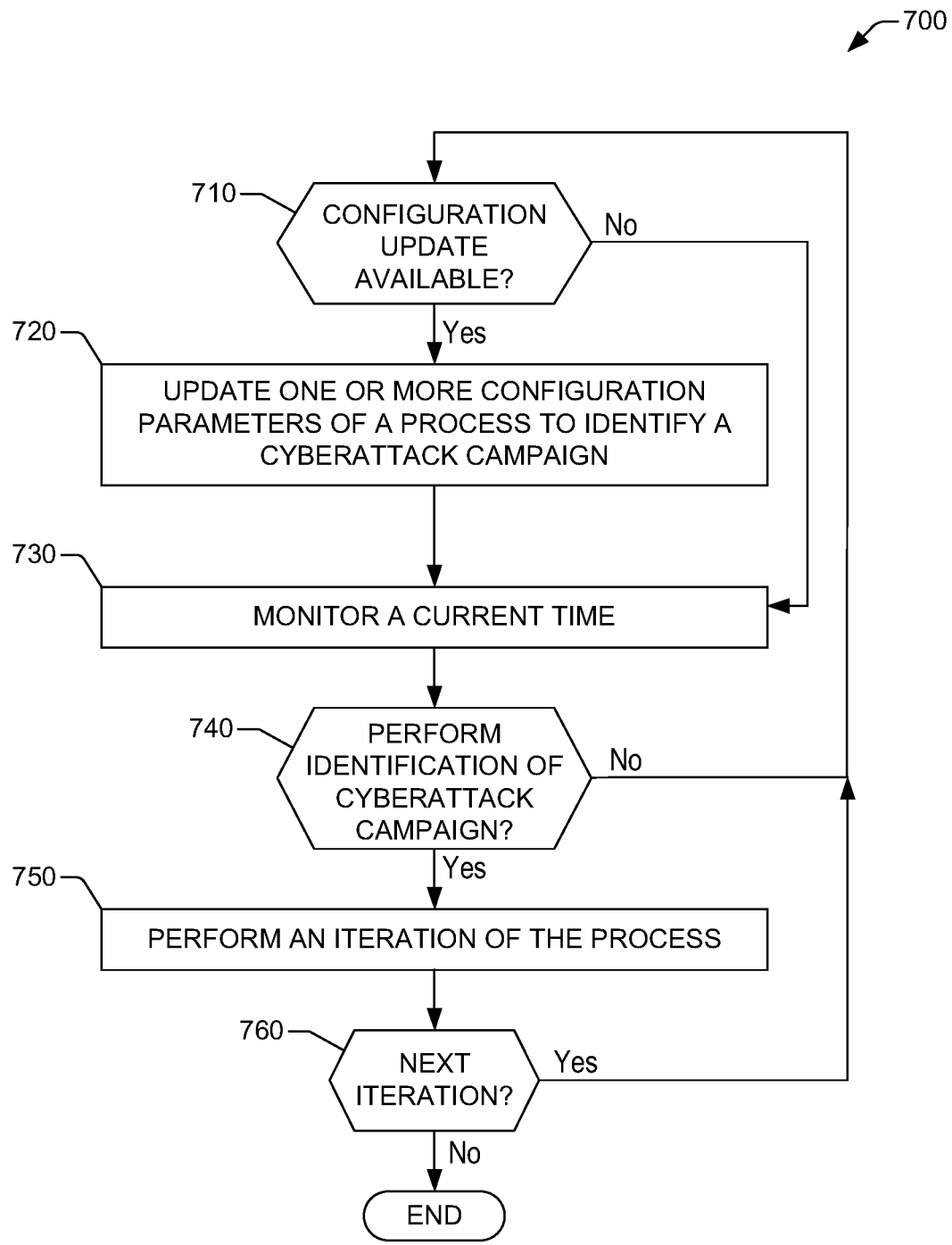
FIG. 7 shows an example method.

FIG. 7 shows a flowchart of an example method 700 for identifying cyberattack campaigns. A computing device or a system of computing devices may implement the example method 700 in its entirety or in part. To that end, each one of the computing devices includes computing resources that may implement at least one of the blocks included in the example method 700. The computing resources comprise, for example, central processing units (CPUs), graphics processing units (GPUs), tensor processing units (TPUs), memory, disk space, incoming bandwidth, and/or outgoing bandwidth, interface(s) (such as input/output (I/O) interfaces or APIs, or both); controller devices(s); power supplies; a combination of the foregoing; and/or similar resources. In one example, the system of computing devices may include programming interface(s); an operating system; software for configuration and/or control of a virtualized environment; firmware; and similar resources.

The system of computing devices may host the ingestion module 120 (FIG. 1), the constructor module 140, and the interface module 160, amongst other software modules. The system may implement the example method 700 by executing one or multiple instances of the ingestion module 120 and the constructor module 140, for example. Thus, the ingestion module 120 and the constructor module 140, individually or in combination, may perform the operations corresponding to the blocks, individually or in combination, of the example method 700.

At block 710, the system (via the ingestion module 120, for example) may determine if a configuration update if available for a process to identify a cyberattack campaign. To that end, the system may monitor presence of a notification message or another type of signaling (an interrupt signal, for example) indicative of the configuration being available. In some instances, the system receives such a notification message and, thus, determines that the configuration update is available. As a result, flow is directed to block 720. In the alternative, a determination that the configuration update is unavailable ("No" branch), the flow of the example method 700 can continue to block 730.

At block 720, the system (via the ingestion module 120, for example) may update the one or more configuration parameters of a process to identify a cyberattack campaign. To that end, the system may define the configuration parameter(s) according to data received with the notification message that caused the update. The data may be payload data contained in the notification message. In some cases, such data (e.g., configuration data 118 (FIG. 1)) can define multiple parameters. Those parameters may comprise a parameter identifying a discovery period (e.g., 24 hours) and another parameter identifying an update period (e.g., 6 hours). Additionally, or in some cases, the parameters may comprise the threshold value used to distinguish, based on risk scores, a high-interest network entity from a non-high-interest risk score, and a campaign TTL defining a time interval that must elapse since initial identification of a cyberattack campaign in order to consider the cyberattack campaign to be inactive.

At block 730, the system may monitor a current time. Monitoring the current time can include receiving data indicative of a current time. The current time may be a wall-clock time or a network time. In some cases, the data may be received in a network time message.

At block 740, the system may determine if identification of a cyberattack campaign is to be performed. To that end, the system may determine if the current time corresponds to the update period relative to a last time that the process to identify cyberattack campaign(s) has been executed. In other words, the system may determine if a time interval equal to the update period (e.g., 6 hours, 8 hours, or 12 hours) has elapsed since the last time that such a process has been executed. A negative determination ("No" branch) may result in the flow of the example method 700 being directed to block 720, to continue monitoring the current time. In the alternative, an affirmative determination ("Yes" branch) may result in the flow of the example method 700 continuing to block 750, where the system can perform an iteration of the process to identify cyberattack campaign(s).

After the iteration has been performed, the system may update an iteration counter and may then determine, at block 760, if a next iteration is to be performed. To that end, the system can determine if at least one cyberattack campaign may remain active at the next iteration—e.g., the system may determine if one or more cyberattack campaign would be active at $T_{n+1}$, where n represents the current iteration. An affirmative determination, may result in the example method 700 being directed to block 710, to continue monitoring for updates and continue monitoring time until a time interval equal to the update period has elapsed and a next iteration is to be performed. In the alternative, a negative determination ("No" branch) may result in the example method 700 ending.

Figure 8:
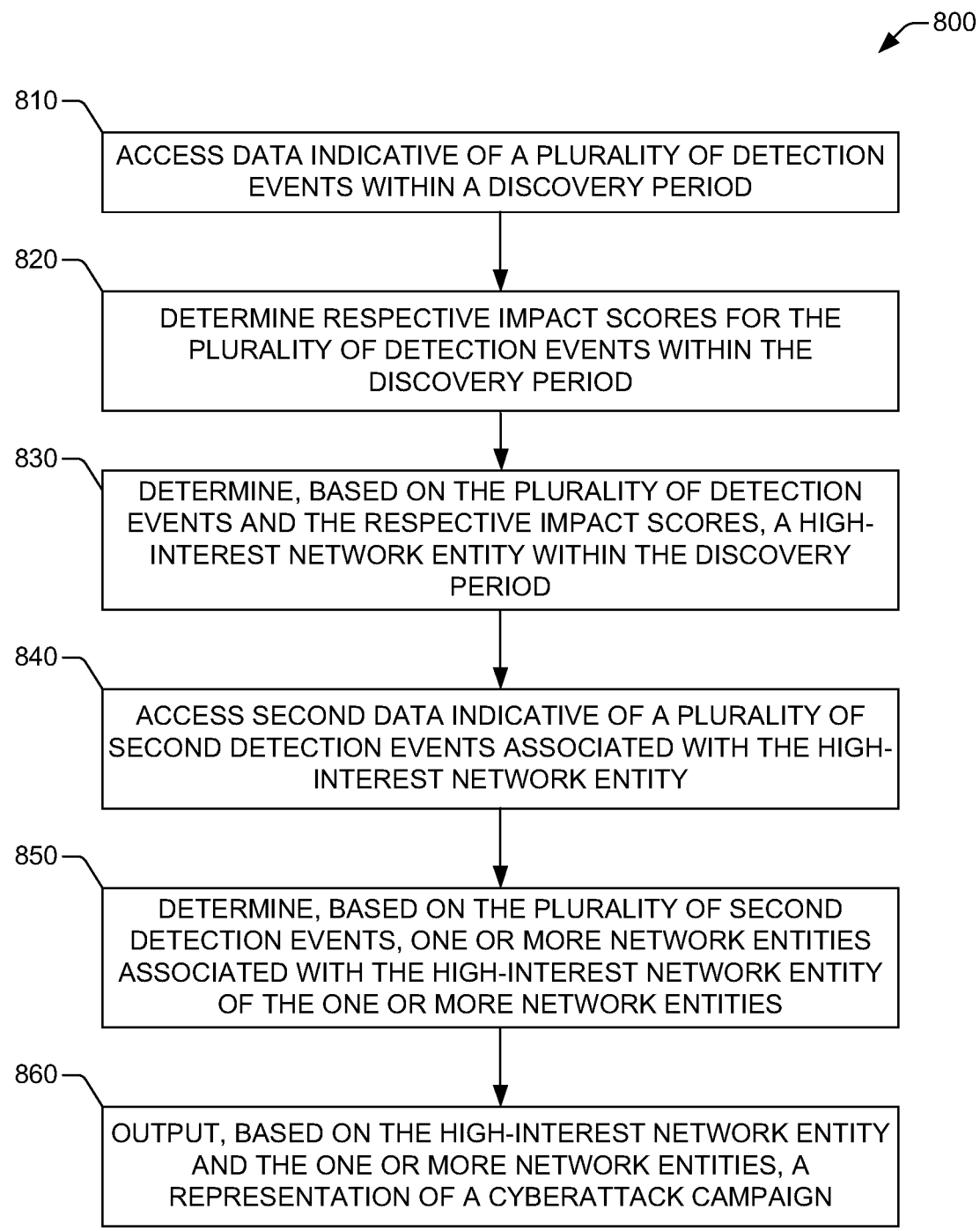
FIG. 8 shows an example method.

FIG. 8 shows a flowchart of an example method 800 for updating one or more cyberattack campaigns. A computing device or a system of computing devices may implement the example method 800 in its entirety or in part. To that end, each one of the computing devices includes computing resources that may implement at least one of the blocks included in the example method 800. The computing resources comprise, for example, CPUs, GPUs, TPUs, memory, disk space, incoming bandwidth, and/or outgoing bandwidth, interface(s) (such as I/O interfaces or APIs, or both); controller devices(s); power supplies; a combination of the foregoing; and/or similar resources. In one example, the system of computing devices may include programming interface(s); an operating system; software for configuration and/or control of a virtualized environment; firmware; and similar resources.

In some cases, the computing device or system of computing devices that implements the example method 700 also may implement, at least partially, the example method 800. Accordingly, the system of computing devices may host the ingestion module 120 (FIG. 1), the constructor module 140, and the interface module 160, amongst other software modules. The system may implement the example method 800 by executing one or multiple instances of the ingestion module 120 and the constructor module 140, for example. Thus, the ingestion module 120 and the constructor module 140, individually or in combination, may perform the operations corresponding to the blocks, individually or in combination, of the example method 800.

At block 810, the system may access data indicative of a plurality of detection events within a discovery period (also referred to herein as a "time period") (e.g., six hours, 12 hours, or 24 hours). The discovery period can be measured relative to a first time, such as an analysis time $T_n$ corresponding to a current iteration of a process of campaign identification. Each detection event (e.g., a detection event $h_{i,j}$) of the plurality of detection events is indicative of a potentially suspicious event within a computer network. As mentioned, the potentially suspicious event may be one of the operations identified in a stage of the MITRE ATT&CK framework.

At block 820, the system may determine respective impact scores for the plurality of detection events within the discovery period. Each impact score of the respective impact scores may be determined based on a respective time-dependent function having a TTL period. The system may configure the TTL period of each event based on severity of the detection event. Thus, each impact score of the respective impact scores may be time-dependent, decreasing over time—referred to herein in some examples as a "decaying impact score." Determining the respective impact scores may comprise evaluating the respective time-dependent function of a first detection event at a second time within the discovery period. The respective time-dependent function may comprises an impulse amplitude. The impulse amplitude may define an initial impact score (e.g., a "decaying impact score") at a defined temporal origin. The respective time-dependent function may further comprise a portion that decays with increasing time from the defined temporal origin. Because detection events may occur at different times, each detection event may have a respective temporal origin that is defined by a timestamp of the detection event. The portion that decays with increasing time from the defined temporal origin may correspond to a monotonically decreasing function (e.g., the "decay function" described herein) that is a continuous, positive-definite, and parameterized at least in part by a half-life parameter. Accordingly, a risk associated with the potentially suspicious event represented by a detection may monotonically decay over time. Examples of the monotonically decreasing function (e.g., the "decay function") may comprise a shifted logistic function, an exponential decay function, and an inverse cotangent function.

At block 830, the system may determine, based on the plurality of detection events and the respective scores, a high-interest network entity within the discovery period. To that end, the system may determine, based on the respective impact scores (e.g., "decaying impact scores"), a risk score corresponding to a network entity within the computer network. Additionally, the system may further determine that the risk score satisfies or exceeds a defined threshold. Further, based on such a determination, the system may configure the network entity as a high-interest network entity.

At block 840, the system may access second data indicative of a plurality of second detection events associated with the high-interest network entity.

At block 850, the system may determine, based on the plurality of second detection events, one or more network entities associated with the high-interest network entity of the one or more network entities.

At block 860, the system may output, based on the high-interest network entity and the one or more network entities, a representation of cyberattack campaign. For example, the system may cause the representation to be output via the user interface 180, the client device 170, etc. Additionally, or in the alternative, the system may cause the representation to be stored (e.g., in memory). Outputting the representation of the cyberattack campaign may comprise updating data indicative of the cyberattack campaign. As is described herein, in some cases, outputting (e.g., updating) the representation of the cyberattack campaign comprises generating a graph having multiple nodes corresponding to respective ones of the high-interest network entity and the one or more network entities. Generating the graph comprises adding an edge linking two nodes corresponding to respective network entities associated with one another by overlapping detection events. The edge represents the overlapping detection events.

Figure 9:
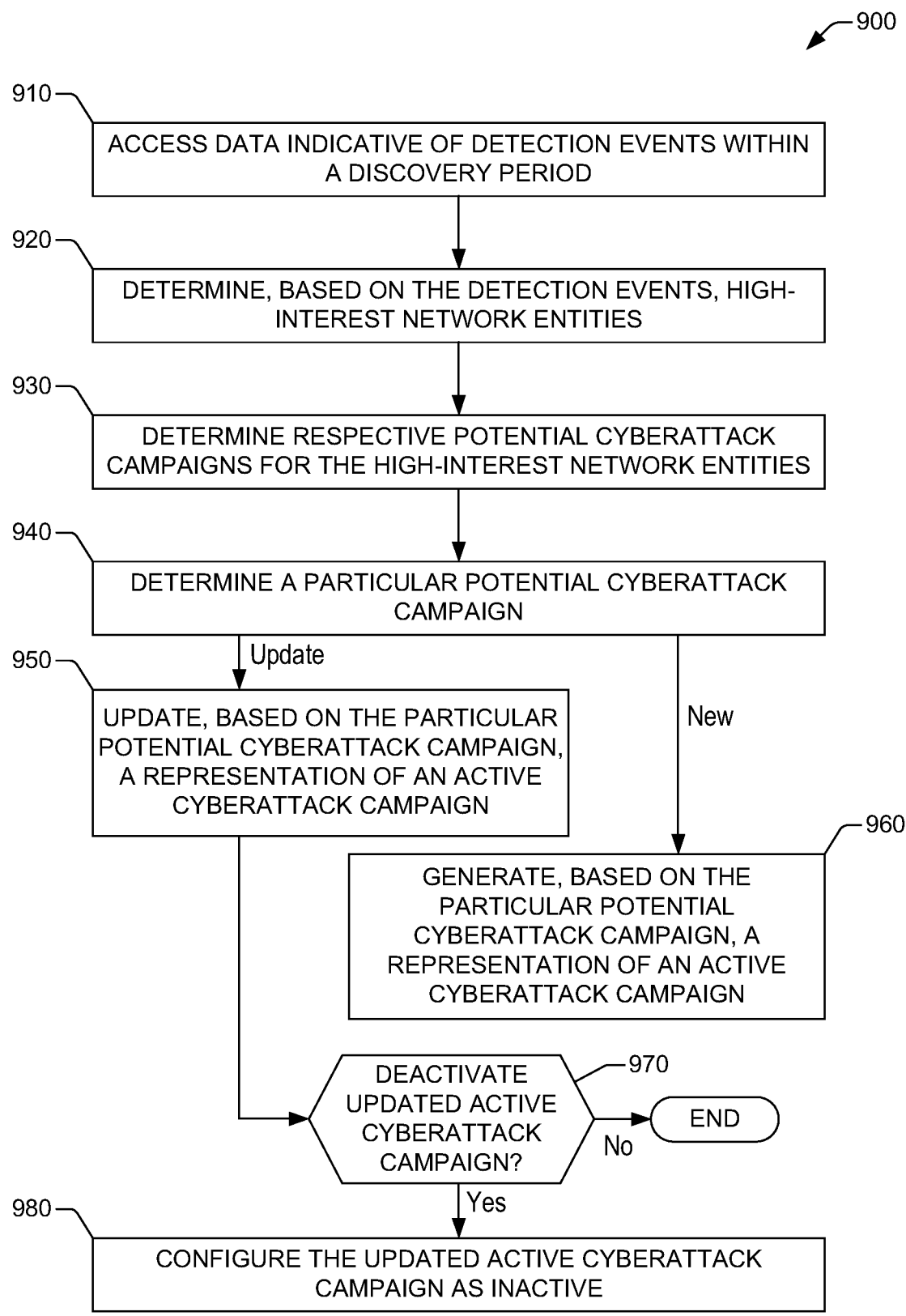
FIG. 9 shows an example method.

FIG. 9 shows a flowchart of an example method 900 for updating one or more cyberattack campaigns. A computing device or a system of computing devices may implement the example method 900 in its entirety or in part. To that end, each one of the computing devices includes computing resources that may implement at least one of the blocks included in the example method 900. The computing resources comprise, for example, CPUs, GPUs, TPUs, memory, disk space, incoming bandwidth, and/or outgoing bandwidth, interface(s) (such as I/O interfaces or APIs, or both); controller devices(s); power supplies; a combination of the foregoing; and/or similar resources. In one example, the system of computing devices may include programming interface(s); an operating system; software for configuration and/or control of a virtualized environment; firmware; and similar resources.

In some cases, the computing device or system of computing devices that implements the example method 700 also may implement, at least partially, the example method 900. Accordingly, the system of computing devices may host the ingestion module 120 (FIG. 1), the constructor module 140, and the interface module 160, amongst other software modules. The system may implement the example method 800 by executing one or multiple instances of the ingestion module 120 and the constructor module 140, for example. Thus, the ingestion module 120 and the constructor module 140, individually or in combination, may perform the operations corresponding to the blocks, individually or in combination, of the example method 800.

At block 910, the system may access data indicative of multiple detection events within a discovery period (also referred to herein as a "time period") (e.g., six hours, 12 hours, or 24 hours). The discovery period can be measured relative to a first time, such as an analysis time $T_n$ corresponding to a current iteration of a process of campaign identification. Each detection event (e.g., a detection event $h_{i,j}$) of the multiple detection events represents a potentially suspicious event within a computer network. As mentioned, the potentially suspicious event can be one of the operations identified in a stage of the MITRE ATT&CK framework.

At block 920, the system may determine, based on the multiple detection events, multiple high-interest network entities. As is described herein, each high-interest network entity has a risk score at the time of interest that satisfies or exceeds a defined threshold value. For example, as is described in connection with Scenario II above, the system may determine that a network entity $E_1$ (a client device) and network entity $E_A$ (a host server device) are high-interest network entities.

At block 930, the system may determine respective potential cyberattack campaigns for the high-interest network entities. To that end, the system may implement the example method 1000 shown in FIG. 10 and described herein after.

At block 940, the system may determine a particular potential cyberattack campaign from the respective potential cyberattack campaigns. The system may determine such a campaign via the campaign manager component 148, for example. The particular potential cyberattack campaign is disjointed from each one of the respective potential cyberattack campaigns that have been determined. As mentioned, a first campaign and a second campaign that lack shared network entities are disjointed. By tracking disjointed cyberattack campaigns, the scope of various cyberattacks can be compartmentalized and, therefore, the evolution can be followed more accurately/consistently.

In some cases, the particular potential cyberattack campaign shares a network entity with a pre-existing active cyberattack campaign (e.g., one of the campaigns 138 retained in data storage 130 (FIG. 1)). Accordingly, the particular potential cyberattack campaign can be deemed as being part of the evolution of that pre-existing active cyberattack campaign. The particular potential cyberattack campaign can be an additional campaign epoch (or campaign episode) in the timeline of the pre-existing cyberattack campaign. In such cases, at block 950, the system may update, based on the particular potential cyberattack campaign, a representation of the pre-existing active cyberattack campaign. Updating such a representation may comprise updating data indicative of the pre-existing active cyberattack campaign. As an example, the particular potential cyberattack campaign may be $C_1^*$ (which is represented by graph 310 (FIG. 3A)) and the pre-existing active cyberattack campaign that is updated may be $C_1^{(1)}$. Updating $C_1^{(1)}$ comprises merging the graph 310 with the graph 220 (FIG. 2), which merger results in the updated active cyberattack campaign $C_1^{(2)}$ represented by the graph 330 (FIG. 3A).

As part of updating such a representation, or as an addition operation included in the example method 900, the system may update a data storage (e.g., data storage 130 (FIG. 1) to include first data indicative of a graph representative of the potential cyberattack campaign and second data indicative of the multiple detection events. As is described herein, the graph comprises a first node representing a first network entity and a second node representing a second network entity. The graph also may comprise an edge linking the first node and the second node, the edge representing a first detection event associated with the first network entity and a second detection event associated with the second network entity. The first detection event and the second detection have respective time-to-live periods that are concurrent and further have at least one attribute (e.g., one or more artifacts) in common.

In other cases, the particular potential cyberattack campaign lacks a common network entity with the pre-existing active cyberattack campaign. Accordingly, the particular potential cyberattack campaign can be identified as a new active cyberattack campaign that has begun within a current update period. Thus, at block 960, the system may generate, based on the particular potential cyberattack campaign, a representation of an active cyberattack campaign. Generating such a representation may comprise generating data indicative of the active cyberattack campaign. As an example, the particular potential cyberattack campaign may be $C_A^*$ (FIG. 3A) corresponding to network entity $E_A$ and the active cyberattack campaign that is generated may be $C_2^{(2)}$.

At block 970, the system may determine if the updated pre-existing active cyberattack campaign is to be deactivated. Such a determination may be based on a time-to-live (TTL) period assigned, to the active cyberattack campaign that has been updated. The TTL period may be assigned at the time of initial identification of the active cyberattack campaign. The TTL period also may be updated at a time after the initial identification of the active cyberattack campaign, during the tracking of that cyberattack campaign. Thus, the system may determine if at a current time, the amount of time elapsed since the time of creation exceeds the currently configured campaign TTL period. The current time may be an analysis time $T_n$ corresponding to a current iteration in the process of campaign identification. A negative determination ("No" branch) may result in the example method 900 being terminated. An affirmative determination ("Yes" branch) may result in the flow of the example method 900 being directed to block 980, where the system may configure the updated active cyberattack campaign as inactive. To that end, the system may configure a state variable corresponding to updated active cyberattack campaign to have a value indicative of the campaign being inactive. The campaign manager component 148 (FIG. 1), for example, may configure the state variable in such a fashion.

Figure 10:
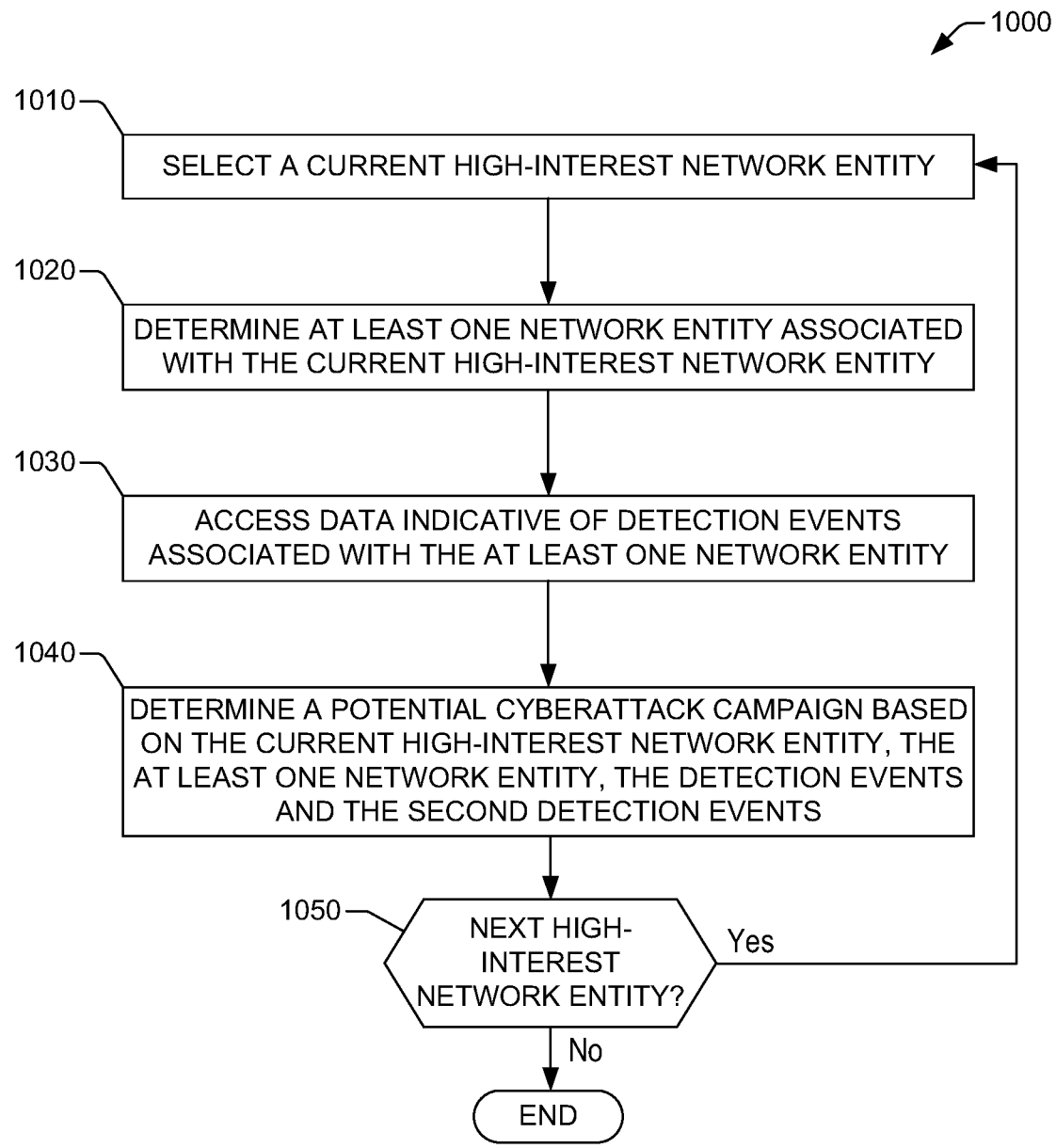
FIG. 10 shows an example method.

FIG. 10 shows a flowchart of an example method 1000 for generating one or multiple representations of respective potential cyberattack campaigns. The example method 1000 may be implemented as part of the example method 900 (FIG. 9), as part of the implementation of block 930 for example. A computing device or a system of computing devices may implement the example method 1000 in its entirety or in part. To that end, each one of the computing devices includes computing resources that may implement at least one of the blocks included in the example method 1000. The computing resources comprise, for example, CPUs, GPUs, TPUs, memory, disk space, incoming bandwidth, and/or outgoing bandwidth, interface(s) (such as I/O interfaces or APIs, or both); controller devices(s); power supplies; a combination of the foregoing; and/or similar resources. In one example, the system of computing devices may include programming interface(s); an operating system; software for configuration and/or control of a virtualized environment; firmware; and similar resources.

In some cases, the computing device or system of computing devices that implements the example method 900 also may implement, at least partially, the example method 1000. Accordingly, the system of computing devices may host the constructor module 140, amongst other software modules. The system may implement the example method 1000 by executing one or multiple instances of the constructor module 140, for example. Thus, the constructor module 140, individually or in combination, may perform the operations corresponding to the blocks, individually or in combination, of the example method 1000.

At block 1010, the system may select (via the entity selector component 144 (FIG. 1) for example) a current high-interest network entity. In some cases, that network entity may be selected from a group of high-interest network entities having a single high-interest network entity. In other cases, the current high-interest network entity may be selected from another group of high-interest network entities having multiple high-interest network entities. In those cases, to select the current high-interest network entity, the system may sort the multiple high-interest network entities according to entity ID and can generate a list of entity IDs. The system may then select an initial entity ID in the list as the current high-interest network entity. In one example, such as in Scenario II above, the system may generate the list $\{E_1,E_4\}$ and can select network entity $E_1$ as the current high-interest network entity.

At block 1020, the system may determine, based on the multiple detection events, at least one network entity associated with the current high-interest network entity. The system may perform such a determination via the entity selector component 144, for example. In some cases, the system may determine that at least some detection events identify the current high-interest network entity (e.g., $E_1$) and include one or more entity IDs and/or data indicative of one or more external hosts. Each one of the entity ID(s) and/or the external host(s) identify a network entity associated with the current high-interest network entity. In one example scenario (such as Scenario II above), the current high-interest network entity is $E_1$, and the system may determine that the at least one network entity associated with $E_1$ comprises network entities $E_2$, $E_3$, $E_4$, and $E_5$.

At block 1030, the system may access data indicative of multiple detection events associated with the at least one network entity. Each detection event of the multiple second detection events is active. That is, the zero-effect time of the detection event is within the discovery period and after a last campaign analysis time. The system may access such data via the entity selector component 144, for example. To access such data, the system may perform a query operation against the detection records 154 retained in the in-memory storage 150 (FIG. 1). The query operation may yield a group of detection events. The system may then determine that two or more detection events in the group of detection events are active. Those two or more detection events form the multiple second detection events. In the example scenario where the current high-interest network entity is $E_1$ and network entities $E_2$, $E_3$, $E_4$, and $E_5$ are associated with the network entity $E_1$, the multiple second detection events may comprise $h_{1,3}$, $h_{3,6}$, $h_{3,8}$, and $h_{4,1}$, for example. In that example scenario, detection events corresponding to $E_2$ and $E_5$ may be inactive.

The multiple detection events may be related to the current high-interest network entity in one or several ways. At least some of the multiple detection events may involve the current high-interest network entity directly, in that those detection events may include attributes identifying the current high-interest network entity. In addition, or in some cases, at least some of the multiple detection events may involve another network entity that has other detection events that include the current high-interest network entity.

At block 1040, the system may determine a potential cyberattack campaign based on the current high-interest network entity, the at least one network entity associated with the current high-interest network entity, the multiple detection events, and the multiple second detection events. Determining the potential cyberattack campaign comprises determining data indicative of the potential cyberattack campaign. Although not illustrated in FIG. 10, the system may retain the data indicative of the potential cyberattack campaign within in-memory storage, such as an in-memory cache. The in-memory storage 150 (FIG. 1) is an example of the in-memory storage.

At block 1050, the system may determine if a next high-interest network entity is to be used to determine another potential cyberattack campaign. For example, the system may determine if one or more high-interest network entities that are included in the list generated at block 1010 have not yet been used to determine another potential cyberattack campaign. In one example, the network entity $E_4$ in the ordered list $\{E_1,E_4\}$ may be the next high-interest to be used to identify that other potential cyberattack campaign. An affirmative determination ("Yes" branch) may result in the flow of the example method 1000 being directed to block 1010, where the next high-interest network entity is configured as the current high-interest network entity as part of selecting the current high-interest network entity.

A negative determination at block 1050 indicates that a single high-interest network entity is available or that multiple high-interest network entities are available and have been traversed, and respective multiple potential cyberattack campaigns have been determined. The negative determination (e.g., "No" branch) may result in the example method 1000 being terminated.

Figure 11:
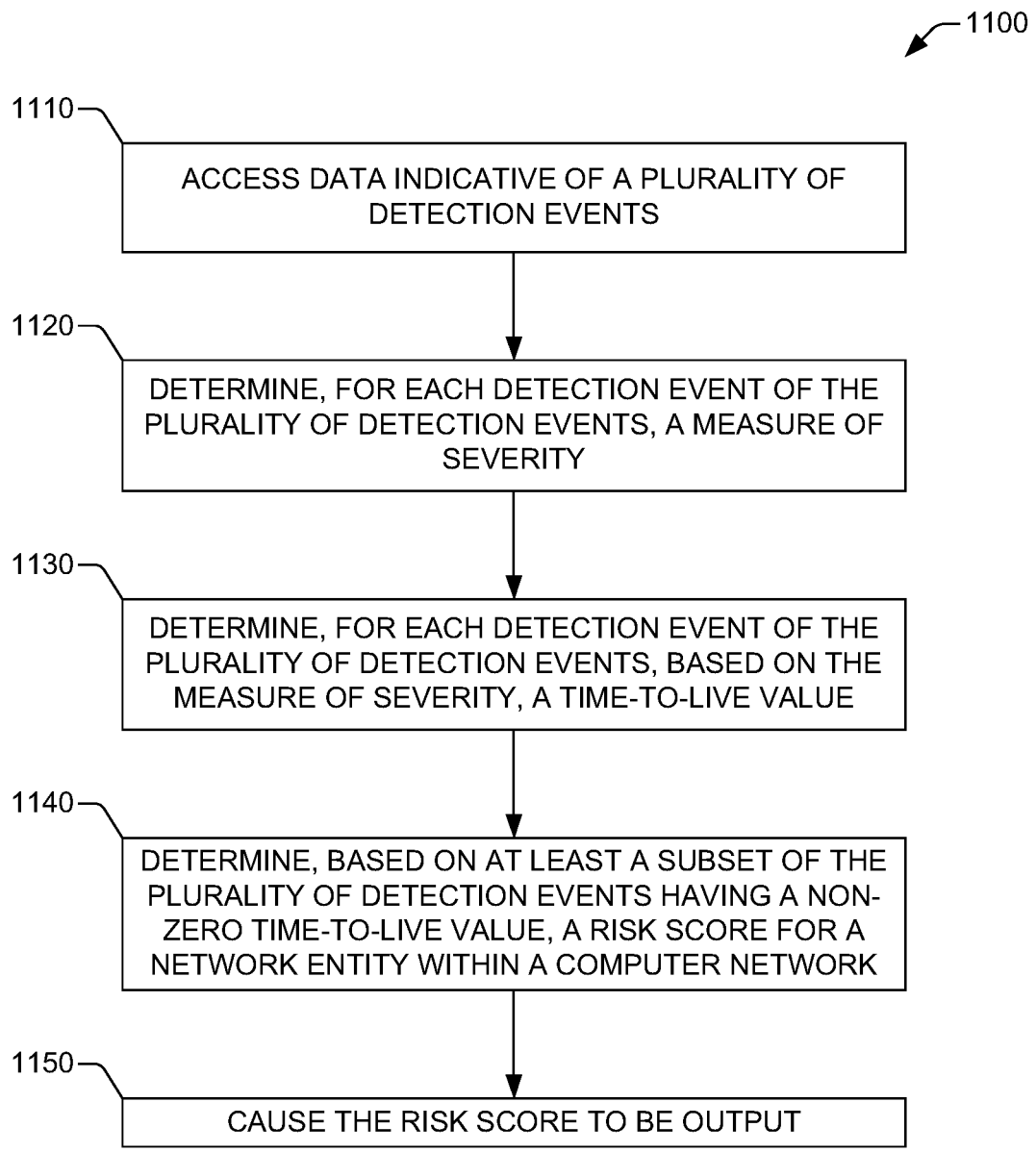
FIG. 11 shows an example method.

FIG. 11 shows a flowchart of an example method 1100 for generating a risk score for a network entity in a computer network. The example method 1100 may be implemented as part of the example method 900 (FIG. 9), as part of the implementation of block 920 for example. A computing device or a system of computing devices may implement the example method 1100 in its entirety or in part. To that end, each one of the computing devices includes computing resources that may implement at least one of the blocks included in the example method 1100. The computing resources comprise, for example, CPUs, GPUs, TPUs, memory, disk space, incoming bandwidth, and/or outgoing bandwidth, interface(s) (such as I/O interfaces or APIs, or both); controller devices(s); power supplies; a combination of the foregoing; and/or similar resources. In one example, the system of computing devices may include programming interface(s); an operating system; software for configuration and/or control of a virtualized environment; firmware; and similar resources.

In some cases, the computing device or system of computing devices that implements the example method 900 also may implement, at least partially, the example method 1100. Accordingly, the system of computing devices may host the constructor module 140, amongst other software modules. The system may implement the example method 1000 by executing one or multiple instances of the constructor module 140, for example. Thus, the constructor module 140, individually or in combination, may perform the operations corresponding to the blocks, individually or in combination, of the example method 1000.

At block 1110, the system may access data indicative of a plurality of detection events. Each detection event of the plurality of detection events is indicative of a potentially suspicious event within a computer network.

At block 1120, the system may determine, for each detection event of the plurality of detection events, a measure of severity.

At block 1130, the system may determine, for each detection event of the plurality of detection events, based on the measure of severity, a time-to-live value. The time-to-live value defines the time interval corresponding to the respective zero-life of each detection event.

At block 1140, the system may determine, based on at least a subset of the plurality of detection events having a non-zero time-to-live value, a risk score for a network entity within the computer network. That subset may include a plurality of multiple second detection events having respective non-zero impact scores. The system may determine the risk score by adding the respective non-zero impact scores.

In some cases, prior to the addition, each one of the respective non-zero impact scores may be normalized to have a value between zero and a defined upper bound.

Each non-zero impact score of the respective non-zero impact scores may be determined using a respective time-dependent function. Thus, each non-zero impact score may be time dependent, decreasing over time—referred to herein in some examples as a "decaying impact score." The respective time-dependent function may comprise an impulse amplitude defining an initial impact score at a defined temporal origin and may further comprise a portion that decays with increasing time from the defined temporal origin. The portion that decays with increasing time from the defined temporal origin may correspond to a monotonically decreasing function (e.g., the "decay function" described herein) that is a continuous, positive-definite, and parameterized at least in part by a half-life parameter. At block 1150, the system may cause the risk score to be output. For example, the system may cause the risk score to be output via the user interface 180, the client device 170, etc. Additionally, or in the alternative, the system may cause the risk score to be stored (e.g., in memory).

Figure 12:
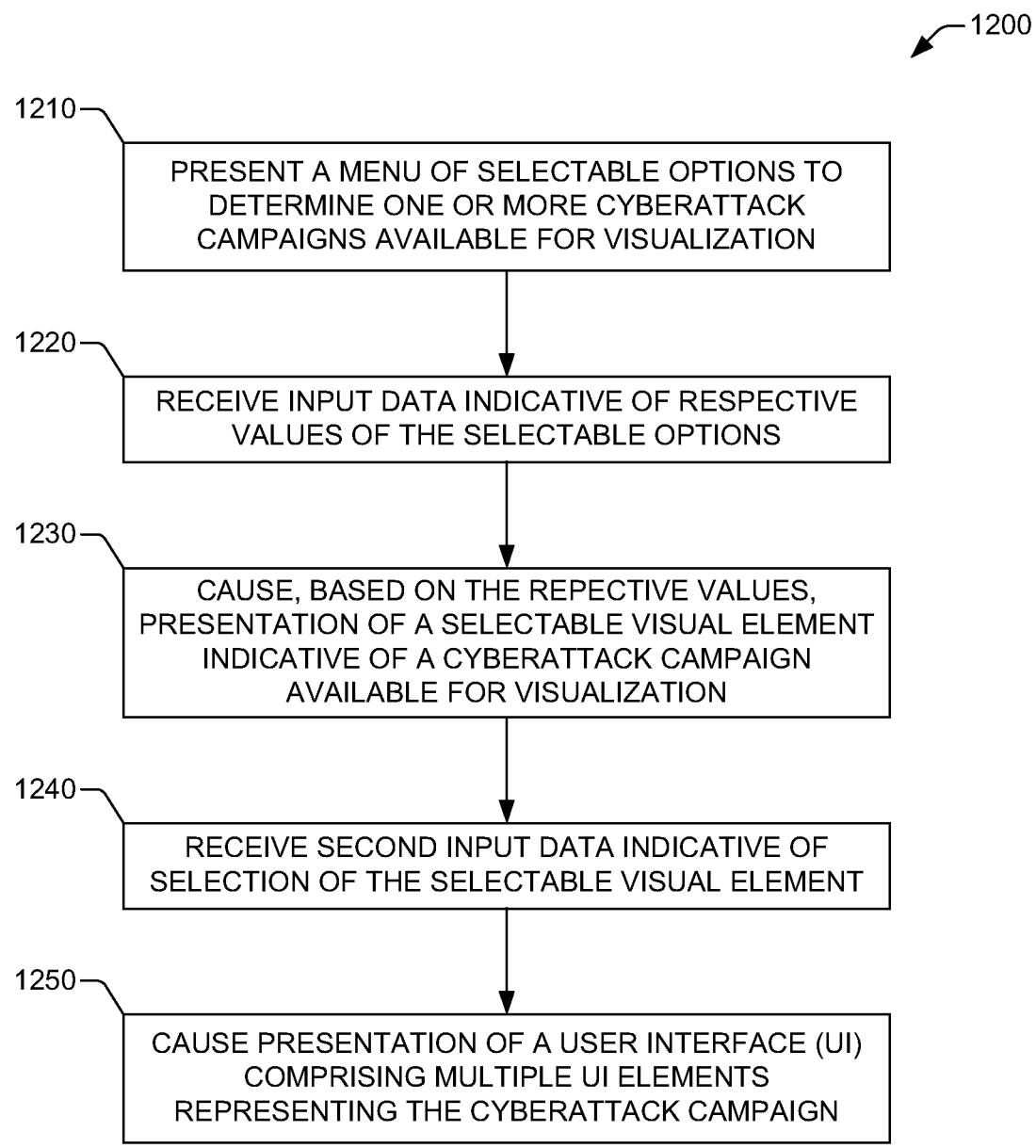
FIG. 12 shows an example method.

FIG. 12 shows a flowchart of an example method 1200 for visualizing one or multiple cyberattack campaigns. A computing device or a system of computing devices may implement the example method 1200 in its entirety or in part. To that end, each one of the computing devices includes computing resources that may implement at least one of the blocks included in the example method 1200. The computing resources comprise, for example, CPUs, GPUs, TPUs, memory, disk space, incoming bandwidth, and/or outgoing bandwidth, interface(s) (such as I/O interfaces or APIs, or both); controller devices(s); power supplies; a combination of the foregoing; and/or similar resources. In one example, the system of computing devices may include programming interface(s); an operating system; software for configuration and/or control of a virtualized environment; firmware; and similar resources.

At block 1210, the computing device may present a menu of selectable options to determine one or more cyberattack campaigns available for visualization. For example, the menu of selectable options can include the fields 414 to 434 within the user interface 180 shown in FIG. 4A.

At block 1220, the computing device may receive input data indicative of respective values of the selectable options.

At block 1230, the computing device may cause, based on the respective values, presentation of a selectable visual element indicative of a cyberattack campaign available for visualization. For example, the selectable visual element may be the selectable visual element 440 within the user interface 180 shown in FIG. 4A.

At block 1240, the computing device may receive second input data indicative of selection of the selectable visual element.

At block 1250, the computing device may cause presentation of a user interface comprising multiple UI elements representing the cyberattack campaign. For example, the computing device may cause presentation of a user interface comprising a graph representing the cyberattack campaign within a time bin overlapping a portion of a campaign epoch of the cyberattack campaign. The graph may be one of the multiple UI element and comprises a first node corresponding to a first network entity in the computer network, a second node corresponding to a second network entity, and an edge linking the first node and the second node. As is described herein, the edge may represent at least one first detection event associated with the first network entity and at least one second detection event associated with the second network entity.

Causing presentation of the graph further may comprises causing presentation of a visual element representative of the edge linking the first node and the second node. The third visual element may comprise a marking indicative of a cyberattack technique involving one or more of the first network entity and the second network entity.

Causing presentation of the user interface at block 1250 may comprise causing presentation of multiple selectable visual elements representative of respective time bins. Each one of the respective time bins spans a portion of a campaign epoch of the one or more campaign epochs.

It is to be understood that the methods and systems described here are not limited to specific operations, processes, components, or structure described, or to the order or particular combination of such operations or components as described. It is also to be understood that the terminology used herein is for the purpose of describing example embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers, or operations. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that serves simply as an example.

Operations and components described herein as being used to perform the disclosed methods and construct the disclosed systems are illustrative unless the context clearly dictates otherwise. It is to be understood that when combinations, subsets, interactions, groups, etc. of these operations and components are disclosed, that while specific reference of each various individual and collective combinations and permutation of these may not be explicitly disclosed, each is specifically contemplated and described herein, for all methods and systems. This applies to all aspects of this application including, but not limited to, operations in disclosed methods and/or the components disclosed in the systems. Thus, if there are a variety of additional operations that may be performed or components that may be added, it is understood that each of these additional operations may be performed and components added with any specific embodiment or combination of embodiments of the disclosed systems and methods.

Embodiments of this disclosure may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof, whether internal, networked, or cloud-based.

Embodiments of this disclosure have been described with reference to diagrams, flowcharts, and other illustrations of computer-implemented methods, systems, apparatuses, and computer program products. Each block of the block diagrams and flowchart illustrations, and combinations of blocks in the block diagrams and flowchart illustrations, respectively, may be implemented by processor-accessible instructions. Such instructions may include, for example, computer program instructions (e.g., processor-readable and/or processor-executable instructions). The processor-accessible instructions may be built (e.g., linked and compiled) and retained in processor-executable form in one or multiple memory devices or one or many other processor-accessible non-transitory storage media. These computer program instructions (built or otherwise) may be loaded onto a general-purpose computer, special purpose computer, or other programmable data processing apparatus to produce a machine. The loaded computer program instructions may be accessed and executed by one or multiple processors or other types of processing circuitry. In response to execution, the loaded computer program instructions provide the functionality described in connection with flowchart blocks (individually or in a particular combination) or blocks in block diagrams (individually or in a particular combination). Thus, such instructions which execute on the computer or other programmable data processing apparatus create a means for implementing the functions specified in the flowchart blocks (individually or in a particular combination) or blocks in block diagrams (individually or in a particular combination).

These computer program instructions may also be stored in a computer-readable memory that may direct a computer or other programmable data processing apparatus to function in a particular manner, such that the instructions stored in the computer-readable memory produce an article of manufacture including processor-accessible instruction (e.g., processor-readable instructions and/or processor-executable instructions) to implement the function specified in the flowchart blocks (individually or in a particular combination) or blocks in block diagrams (individually or in a particular combination). The computer program instructions (built or otherwise) may also be loaded onto a computer or other programmable data processing apparatus to cause a series of operations to be performed on the computer or other programmable apparatus to produce a computer-implemented process. The series of operations may be performed in response to execution by one or more processor or other types of processing circuitry. Thus, such instructions that execute on the computer or other programmable apparatus provide operations for implementing the functions specified in the flowchart blocks (individually or in a particular combination) or blocks in block diagrams (individually or in a particular combination).

Accordingly, blocks of the block diagrams and flowchart diagrams support combinations of means for performing the specified functions in connection with such diagrams and/or flowchart illustrations, combinations of operations for performing the specified functions and program instruction means for performing the specified functions. Each block of the block diagrams and flowchart illustrations, and combinations of blocks in the block diagrams and flowchart illustrations, may be implemented by special purpose hardware-based computer systems that perform the specified functions or operations, or combinations of special purpose hardware and computer instructions.

The methods and systems may employ artificial intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the computer-implemented methods, apparatuses, devices, and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is in no way intended that an order be inferred, in any respect. This holds for any possible non-express basis for interpretation, including: matters of logic with respect to arrangement of operations or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims

The invention claimed is:

1. A method comprising:
   accessing data indicative of a plurality of detection events, each detection event of the plurality of detection events is indicative of a potentially suspicious event within a computer network;
   determining, for each detection event of the plurality of detection events, a measure of severity;
   determining, for each detection event of the plurality of detection events, based on the measure of severity, a time-to-live value;
   determining, based on at least a subset of the plurality of detection events having a nonzero time-to-live value, a risk score for a network entity within the computer network;

identifying, based on the risk score, the network entity as a potentially compromised entity; and causing the risk score and identification of the network entity to be output.

2. The method of claim 1, where the subset comprises the plurality of detection events having a non-zero time-to-live value and having respective non-zero impact scores, each non-zero impact score of the respective non-zero impact scores being determined using a respective time-dependent function.

3. The method of claim 2, wherein the determining the risk score adding the respective non-zero impact scores.

4. The method of claim 2, wherein the respective time-dependent function comprises an impulse amplitude defining an initial impact score at a defined temporal origin and further comprises a portion that decays with increasing time from the defined temporal origin.

5. The method of claim 4, wherein the portion that decays with increasing time from the defined temporal origin corresponds to a monotonically decreasing function that is a continuous, positive-definite, and parameterized at least in part by a half-life parameter.

6. A method comprising:
accessing data indicative of a plurality of detection events within a time period relative to a first time, each detection event of the plurality of detection events is indicative of a potentially suspicious activity within a computer network;
determining respective impact scores for the plurality of detection events within the time period, each impact score of the respective impact scores being determined using a respective time-dependent function having a time-to-live period;
determining, based on the plurality of detection events and the respective impact scores, a high-interest network entity within the time period;
accessing second data indicative of a plurality of second detection events associated with the high-interest network entity at a second time before the first time;
determining, based on the plurality of second detection events, one or more network entities associated with the high-interest network entity;
outputting, based on the high-interest network entity and the one or more network entities, a representation of a cyberattack campaign, wherein the representation identifies, in the computer network, one or more potentially compromised entities for responsive analysis or remediation.

7. The method of claim 6, wherein the determining the respective impact scores comprises;
configuring, based on severity of a first detection event of the plurality detection events, the time-to-live period for the first detection event; and
evaluating the respective time-dependent function of the first detection event at a second time within the time period.

8. The method of claim 6, wherein the respective time-dependent function comprises an impulse amplitude defining an initial impact score at a defined temporal origin and further comprises a portion that decays with increasing time from the defined temporal origin.

9. The method of claim 8, wherein the portion that decays with increasing time from the defined temporal origin corresponds to a monotonically decreasing function that is continuous, positive-definite, and parameterized at least in part by a half-life parameter.

10. The method of claim 9, wherein the monotonically decreasing function is one of a logistic shifted function, an exponential decay function, or an inverse cotangent function.

11. The method of claim 6, wherein the determining, based on the plurality of detection events and the respective impact scores, the high-interest network entity comprises:
determining, based on the respective impact scores, a risk score corresponding to a network entity within the computer network;
determining that the risk score satisfies or exceeds a defined threshold; and
configuring the network entity as the high-interest network entity.

12. The method of claim 6, wherein outputting the cyberattack data comprises generating a graph having multiple nodes corresponding to respective ones of the high-interest network entity and the one or more network entities.

13. The method of claim 12, wherein the generating the graph comprises adding an edge linking two nodes corresponding to respective network entities associated with one another by overlapping detection events, the edge representing the overlapping detection events.

14. A method comprising:
accessing data indicative of multiple detection events associated with a first time, each detection event of the multiple detection events is indicative of a potentially suspicious event within a computer network;
determining, based on the multiple detection events, multiple high-interest network entities, wherein each high-interest network entity of the multiple high-interest network entities has a respective risk score that satisfies or exceeds a defined threshold;
accessing second data indicative of multiple second detection events associated with the multiple high-interest network entities at a second time before the first time, each detection event of the multiple second detection events having an unelapsed time-to-live period;
determining, based on the multiple second detection events, one or more network entities associated with a particular high-interest network entity of the multiple network entities;
determining a potential cyberattack campaign based on the particular high-interest network entity and the one or more network entities; and
generating a representation of an active cyberattack campaign by merging data indicative of the potential cyberattack campaign with data indicative of the active cyberattack campaign, wherein the representation enables detection of one or more additional compromised entities in the computer network.

15. The method of claim 14, further comprising causing presentation of a user interface comprising a graph, wherein the graph comprises the representation of the active cyberattack campaign.

16. The method of claim 14, further comprising causing presentation of a user interface comprising:
a first visual element identifying a first detection event corresponding to the active cyberattack campaign; and
a second visual element identifying a time interval in which the first detection event occurred.

17. The method of claim 14, further comprising:
determining that a second active cyberattack campaign has a last active time that exceeds a campaign time-to-live period of the second active cyberattack campaign; and configuring the second active cyberattack campaign as inactive.

18. The method of claim 14, wherein the determining the potential cyberattack campaign comprises generating a graph having multiple nodes corresponding to respective ones of the particular high-interest network entity and the one or more network entities.

19. The method of claim 18, wherein the generating the graph comprises adding an edge linking two nodes corresponding to respective network entities associated with one another by overlapping detection events, the edge representing the overlapping detection events.

20. The method of claim 18, wherein outputting the representation of the active cyberattack campaign comprises updating a last active time configured for the data indicative of the active cyberattack campaign.

21. The method of claim 14, wherein each detection event of the multiple detection events has a decaying impact score that transitions from a finite value to zero over a respective time-to-live period.

22. The method of claim 21, wherein the determining, based on the multiple detection events, multiple high-interest network entities comprises:
- determining a first network entity involved in one or more detection events of the multiple detection events;
- generating a first risk score for the first network entity by adding respective decaying impact scores of the one or more detection events; and
- determining that the first risk score satisfies or exceeds the threshold value.

* * * * *